(12) United States Patent
Kastanis et al.

(10) Patent No.: US 11,590,882 B1
(45) Date of Patent: Feb. 28, 2023

(54) METHOD AND APPARATUS FOR VEHICULAR LIGHT FIXTURES

(71) Applicant: JST Performance, LLC, Gilbert, AZ (US)

(72) Inventors: Nick Kastanis, Gilbert, AZ (US); Johnathan J. Heiner, Mesa, AZ (US); Bradley J. LaMarche, Gilbert, AZ (US); Edgar A. Madril, Mesa, AZ (US)

(73) Assignee: JST Performance, LLC, Gilbert, AZ (US)

( * ) Notice: Subject to any disclaimer, the term of this patent is extended or adjusted under 35 U.S.C. 154(b) by 0 days.

(21) Appl. No.: 17/199,190

(22) Filed: Mar. 11, 2021

Related U.S. Application Data

(63) Continuation of application No. 15/595,766, filed on May 15, 2017, now Pat. No. 10,953,788.

(60) Provisional application No. 62/461,624, filed on Feb. 21, 2017, provisional application No. 62/339,837, filed on May 21, 2016.

(51) Int. Cl.
*B60Q 1/24* (2006.01)
*B60Q 1/00* (2006.01)

(52) U.S. Cl.
CPC ............ *B60Q 1/24* (2013.01); *B60Q 1/0035* (2013.01); *B60Q 2400/00* (2013.01); *B60Q 2900/10* (2013.01)

(58) Field of Classification Search
CPC .... B60Q 1/24; B60Q 1/0035; B60Q 2400/00; B60Q 2900/10
See application file for complete search history.

(56) References Cited

U.S. PATENT DOCUMENTS

| 5,005,797 | A | ‡ | 4/1991 | Maekawa | B60R 1/0617 248/289.11 |
|---|---|---|---|---|---|
| 5,137,247 | A | ‡ | 8/1992 | Lang | B60R 1/0617 248/549 |
| 10,106,074 | B2 | ‡ | 10/2018 | Salter | B60Q 1/24 |
| 2004/0004841 | A1 | ‡ | 1/2004 | Lang | B60Q 1/2665 362/494 |
| 2004/0062047 | A1 | ‡ | 4/2004 | Camarota | A47K 3/003 362/399 |
| 2005/0174645 | A1 | ‡ | 8/2005 | Boddy | B60Q 1/2665 359/599 |
| 2008/0068851 | A1 | ‡ | 3/2008 | Waldmann | B60Q 1/2665 362/494 |

(Continued)

*Primary Examiner* — Kevin Quarterman
(74) *Attorney, Agent, or Firm* — Calfee, Halter & Griswold LLP

(57) ABSTRACT

A terrain viewing apparatus is provided to enable greater viewability of environmental conditions around a vehicle. A housing of the terrain viewing apparatus may include a lighting apparatus for emitting light and illuminating environmental conditions during nighttime, dusk, or adverse weather conditions. The housing may further include a reflecting apparatus to increase an operator's ability to view environmental conditions outside the vehicle. One or more joints may enable the housing to be adjustable with respect to the vehicle. An internal joint may enable the reflecting apparatus to be adjustable with respect to the housing. The lighting apparatus may receive power from the vehicle. The lighting and reflecting apparatuses may be electrically coupled to the vehicle and may be controllable therefrom.

23 Claims, 17 Drawing Sheets

(56) References Cited

U.S. PATENT DOCUMENTS

| | | | |
|---|---|---|---|
| 2014/0198515 A1* | 7/2014 | Tulio | B60Q 1/32 362/520 |
| 2015/0036371 A1‡ | 2/2015 | Ichikawa | B60Q 9/008 362/511 |
| 2015/0175057 A1‡ | 6/2015 | Salter | F21S 43/13 362/510 |
| 2016/0082880 A1‡ | 3/2016 | Co | B60Q 1/2611 701/2 |

\* cited by examiner
‡ imported from a related application

METHOD AND APPARATUS FOR VEHICULAR LIGHT FIXTURES

FIELD OF THE INVENTION

The present invention generally relates to lighting systems, and more particularly to lighting systems distributing light from a vehicle.

BACKGROUND

Light emitting diodes (LEDs) have been utilized since about the 1960s. However, for the first few decades of use, the relatively low light output and narrow range of colored illumination limited the LED utilization role to specialized applications (e.g., indicator lamps). As light output improved, LED utilization within other lighting systems, such as within LED "EXIT" signs and LED traffic signals, began to increase. Over the last several years, the white light output capacity of LEDs has more than tripled, thereby allowing the LED to become the lighting solution of choice for a wide range of lighting solutions.

For example, the off-road vehicle market has seen a broad shift toward the use of LEDs in lighting systems. Visibility during off-road operation of the off-road vehicle may be poor due to any number of environmental, vehicular, or other conditions. For example, heavy wind, rain, snow, sleet, or other precipitation or particulates in the air may reduce visibility. Further, the off-road vehicle may have limited mounting locations for lighting systems, thereby limiting the vehicle's light output. Further, an operator may have to make compromises between which lighting modules to mount within the system due to limited space, which may limit his ability to signal vehicle operations to other vehicles in the area.

In general, lighting systems are mounted to an off-road vehicle by a mounting apparatus. Further, lighting systems become increasingly heavier with the addition of more and more lighting modules. Thus, the larger the system, the greater the strain on the mounting apparatus. For example, lighting systems may frequently shift, rotate, or break off of the off-road vehicle due to failure of the mounting apparatus during operation of the off-road vehicle on uneven terrain.

Efforts continue, therefore, to develop lighting systems which maximize light output, minimize weight and use of mounting space, and enable all required and optional signaling options to be performed.

SUMMARY

To overcome limitations in the prior art, and to overcome other limitations that will become apparent upon reading and understanding the present specification, various embodiments of the present invention disclose a method and apparatus for vehicular light fixtures.

In accordance with one embodiment of the invention, a terrain viewing apparatus comprises a housing, a lighting apparatus coupled on a first side of the housing, a reflecting apparatus coupled on a second side of the housing, and a mounting apparatus coupled to the housing, wherein the mounting apparatus is configured to mount the terrain viewing apparatus to a structural element of a vehicle.

In accordance with another embodiment of the invention, a joint provided to enable adjustment of a terrain viewing apparatus with respect to a vehicle, the joint capable of providing rotation in a pitch, a yaw, and a roll rotation, the joint comprises a first element, a second element, and a third element, wherein the first element is rotatable with respect to the third element about a first axis, and wherein the second element is rotatable with respect to the third element about a second axis.

In accordance with another embodiment of the invention, a method of configuring a terrain viewing apparatus comprises providing a terrain viewing apparatus with a housing, a lighting apparatus coupled to the housing, a mounting apparatus coupled to the housing, and a first joint coupled between the housing and the mounting apparatus; mounting the terrain viewing apparatus to a vehicle via the mounting apparatus; and articulating the first joint so that the housing is in a desired orientation with respect to the vehicle.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention are applied to a method and apparatus for enhancing the view of an operator of a vehicle using the principles of light and reflection. A terrain viewing apparatus may be provided which is mountable to a structural element of a vehicle. A housing of the terrain viewing apparatus may be configured to receive a lighting apparatus capable of illuminating environmental conditions outside the vehicle. The housing may further be configured to receive a reflecting apparatus capable of providing alternative views to the operator of the vehicle (e.g., providing a rearward view of environmental conditions).

The housing may be connected to a mounting apparatus which is capable of mounting to a structural element of the vehicle. Further, the mounting apparatus may be capable of mounting to a variety of sizes of structural elements. One or more joints may be connected between the housing and the mounting apparatus, such that the joints provide one or more degrees of freedom to enable movement of the housing with respect to the mounting apparatus. For example, the joints may provide for rotational and/or translational movement of the housing with respect to the mounting apparatus.

The reflecting apparatus may be connected to the housing and/or the lighting apparatus by a joint capable of providing one or more degrees of freedom to enable movement of the reflecting apparatus with respect to the housing. The lighting apparatus may be fixed to the housing so as to be immovable with respect to the housing.

The lighting apparatus may be configured with light sources (e.g., light emitting diodes (LEDs), or laser diodes (LDs), hereinafter LEDs) to enable emission of light outwardly from the housing (e.g., to illuminate environmental conditions during night time, dusk, or adverse weather conditions). Control of the LEDs may be provided for internally (e.g., via a printed circuit board assembly, or PCBA, having control circuitry) and/or externally by a controller. For example, power from a power source in the vehicle may extend to the lighting apparatus, and may provide power to the PCBA. The control circuitry may regulate and/or control power provided to the LEDs in one or more modes of operation.

Light emitted from the LEDs may be redirected or subtended by one or more optics, lenses, and/or light pipes. Each group of optics, lenses, and/or light pipes may be configured to produce a particular light output (e.g., beam pattern), such that operational groups of LEDs, when paired with each optic, lens, or light pipe, collectively produce the desired light output. For example, an operational group may produce one or more of collimated, focused, and/or diffused light.

Figure 1:
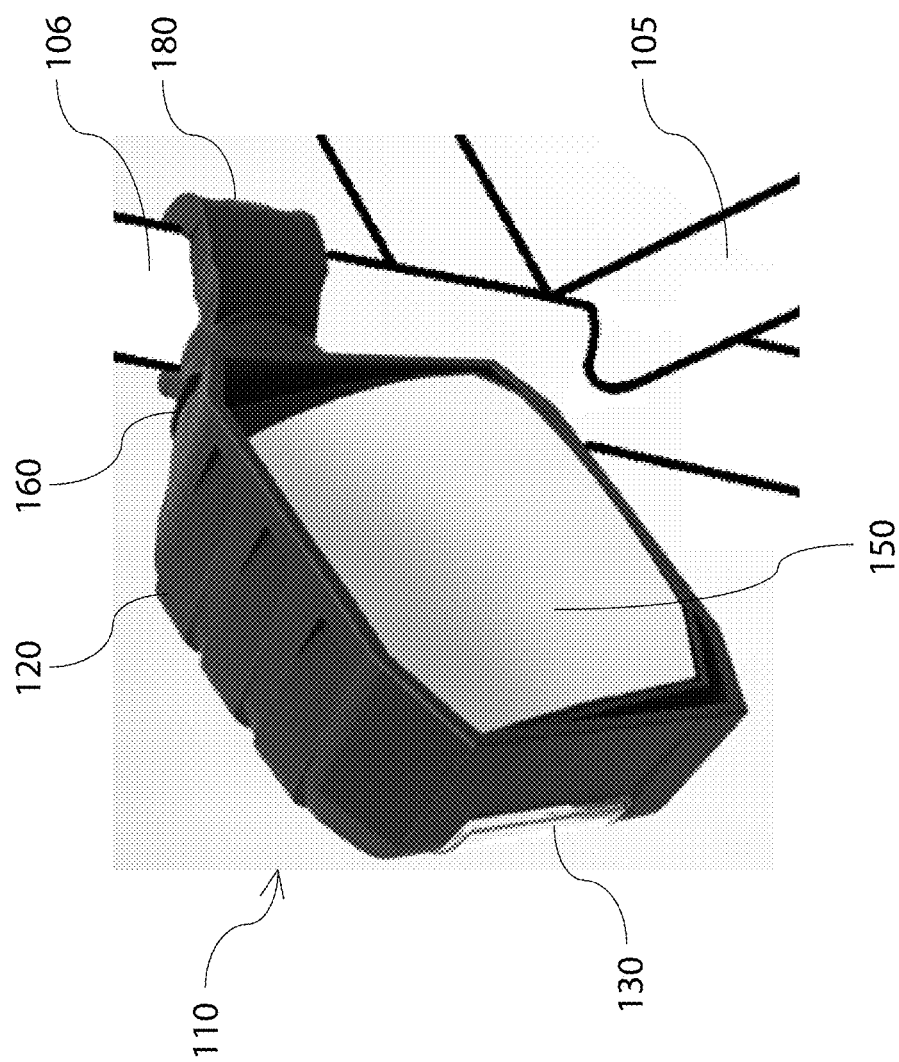
FIG. 1 illustrates an isometric view of a terrain viewing apparatus mounted on a bar of a vehicle according to an embodiment of the present invention.

FIG. 1 illustrates an isometric view of a terrain viewing apparatus 110 according to an embodiment of the present invention. In general, the terrain viewing apparatus 110 may be mounted to a vehicle 105 to enable an operator of vehicle 105 to view terrain forwardly, laterally (e.g., sidewardly), rearwardly, and/or in any other suitable direction from the vehicle.

The terrain viewing apparatus 110 may include a housing 120 capable of receiving a lighting apparatus 130 for illuminating the terrain during dawn, dusk, night-time, low-visibility, and/or adverse weather conditions (e.g., snow). For example, lighting apparatus 130 may enable an operator to see environmental conditions in the terrain (e.g., environmental condition 701 of FIG. 7). Further, housing 120 may be capable of receiving a reflecting apparatus 150 for increasing the operator's visibility around vehicle 105. For example, reflecting apparatus 150 may enable an operator of vehicle 105 to see rearwardly of vehicle 105.

Housing 120 may be secured to a structural element 106 of vehicle 105 (e.g., a bar of a roll cage of vehicle 105). Housing 120 may be secured to element 106 by a mounting apparatus 180. For example, mounting apparatus 180 may be any one of a belt, a clasp, a clamp, a clip, a snap, a strap, a tie, or any combination thereof.

Housing 120 may be adjustable with respect to vehicle 105 by one or more joints 160, which may provide housing 120 with one or more degrees of freedom. For example, a first joint (e.g., first joint 755, of FIG. 7) may provide housing 120 with one rotational degree of freedom. In another example, a second joint (e.g., second joint 760, of FIG. 7) may provide housing 120 with three rotational degrees of freedom. In another example, a third joint (not shown) may provide housing 120 with one or more translational degrees of freedom.

Reflecting apparatus 150 may be adjustable with respect to housing 120 by one or more joints (e.g., joint 1452 of FIG. 14), which may provide reflecting apparatus 150 with one or more degrees of freedom. For example, a first joint (not shown) may provide reflecting apparatus 150 with one rotational degree of freedom. In another example, a second joint (not shown) may provide reflecting apparatus 150 with a second rotational degree of freedom. In another example, a single joint may provide multiple degrees of freedom.

Figure 2:
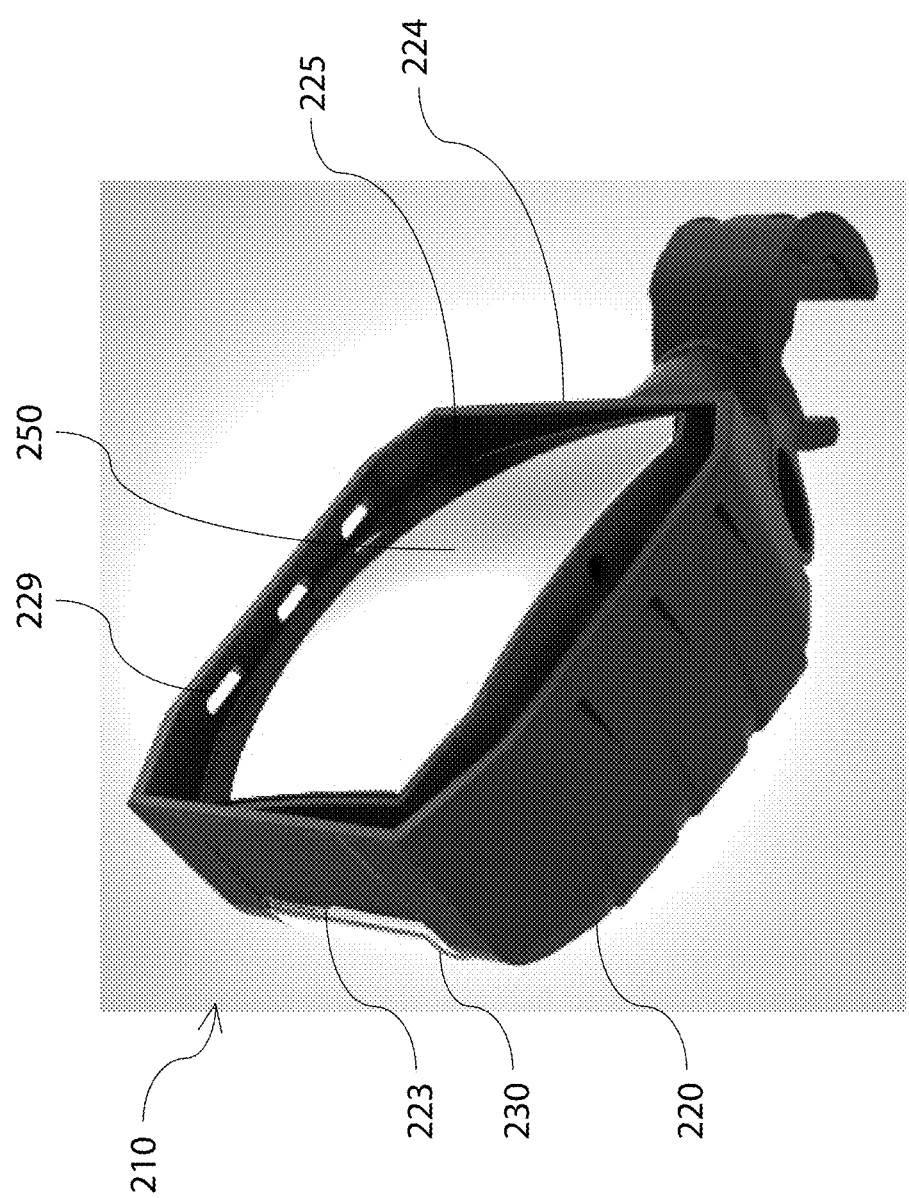
FIG. 2 illustrates an isometric view of a terrain viewing apparatus according to another embodiment of the present invention.

FIG. 2 illustrates an isometric view of a terrain viewing apparatus 210 according to another embodiment of the present invention. The terrain viewing apparatus 210 may have a lighting apparatus 230 and/or a reflecting apparatus 250 received within a hollow interior 225 of a housing 220. Lighting apparatus 230 may be positioned at a forward opening 223 of housing 220, and reflecting apparatus 250 may be positioned at a rearward opening 224 of housing 220 opposite forward opening 223.

Housing 220 may be formed of a material selected to improve performance characteristics (e.g., durability). For example, housing 220 may be formed of metal (e.g., aluminum), plastic (e.g., Lexan resin), composite material (e.g., glass-filled nylon), and/or any combination thereof. Housing 220 may have one or more scoops 229 extending through housing 220 to induce turbulent airflow and/or reduce drag of housing 220. For example, housing 220 may have one scoop 229. In another example, housing 220 may have two or more scoops (e.g., three scoops 229).

Figure 3:
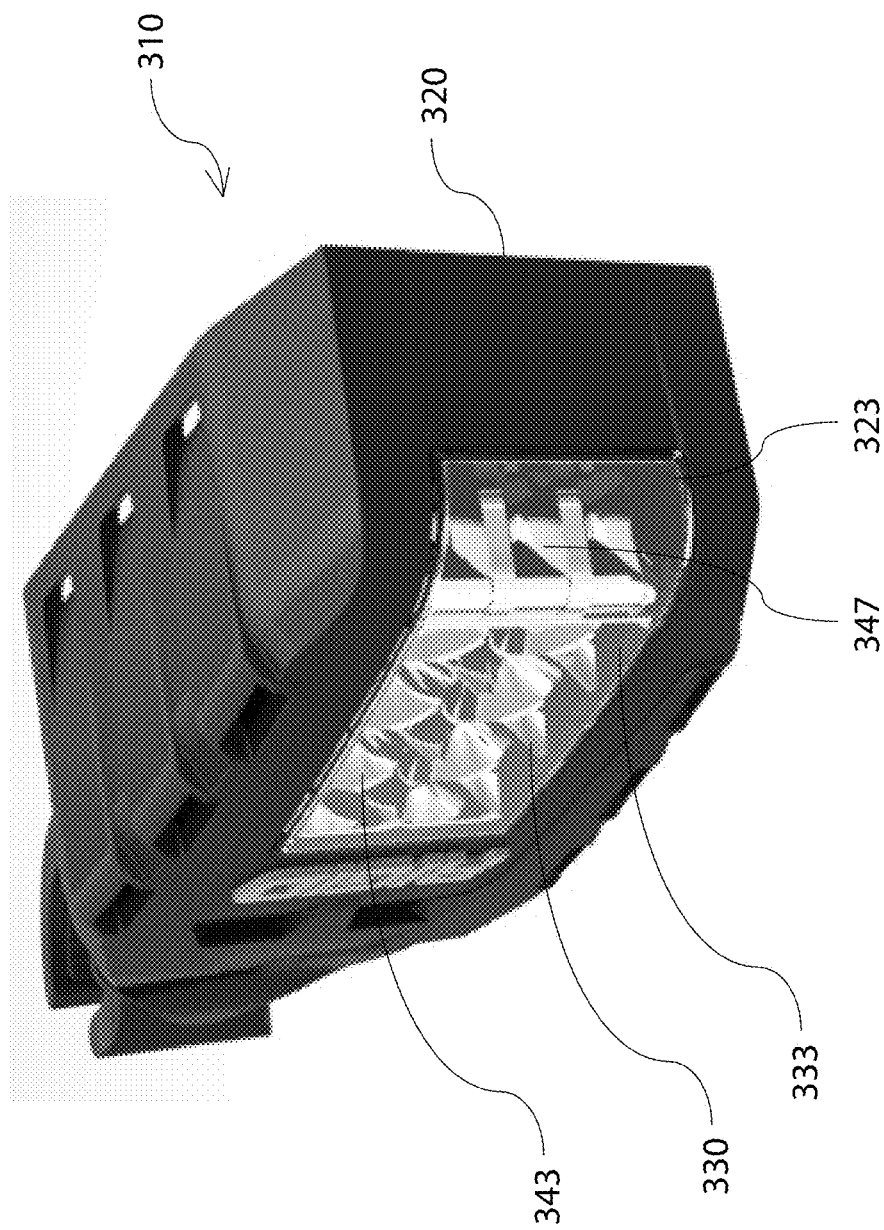
FIG. 3 illustrates an isometric view of a terrain viewing apparatus according to another embodiment of the present invention.

FIG. 3 illustrates an isometric view of a terrain viewing apparatus 310 according to another embodiment of the present invention. The terrain viewing apparatus 310 may have a lighting apparatus 330 positioned at a forward opening 323 of a housing 320, such that lighting apparatus 330 may substantially enclose and/or seal forward opening 323. Lighting apparatus 330 may be secured to housing 320 by one or more catch, clasp, clip, fastener, hanger, hook, knob, latch, peg, pin, snap, tie, or any combination thereof. For example, lighting apparatus 330 may be secured to housing 320 by one or more fasteners (not shown).

Lighting apparatus 330 may have a channel 333 extending along a portion thereof for receiving one or more printed circuit board assemblies (PCBAs) (e.g., PCBA 1336 of FIG. 13), one or more light emitting diodes (LEDs) (e.g., LEDs 1339 of FIG. 13), and one or more optics (e.g., optics 347, 343).

The PCBAs may be secured within channel 333 and may include control circuitry capable of providing and/or controlling power to the LEDs. The optics (e.g., optics 343, 347) may be capable of redirecting light emitted by the LEDs into a particular beam pattern. For example, the optics may be capable of collimating, focusing, and/or diffusing light emitted by the LEDs.

The LEDs may be grouped into one or more operational groups to enable lighting apparatus 330 to be operable for one or more lighting capabilities. For example, a first operational group of LEDs may provide one lighting capability. In another example, the first and a second operational group of LEDs may provide another lighting capability. Each operational group of LEDs may have one or more LEDs (e.g., 1, 2, 3, 6, or more LEDs).

To increase the versatility of lighting apparatus 330, each optic may correspond to one or more operational groups of LEDs and/or each operational group of LEDs may correspond to one, less than one, or more than one optic. For example, optic 343 may be associated with a first operational group of LEDs. In another example, optic 347 may be associated with a second operational group of LEDs. In another example, no optic may be associated with a third operational group of LEDs.

Figure 4:
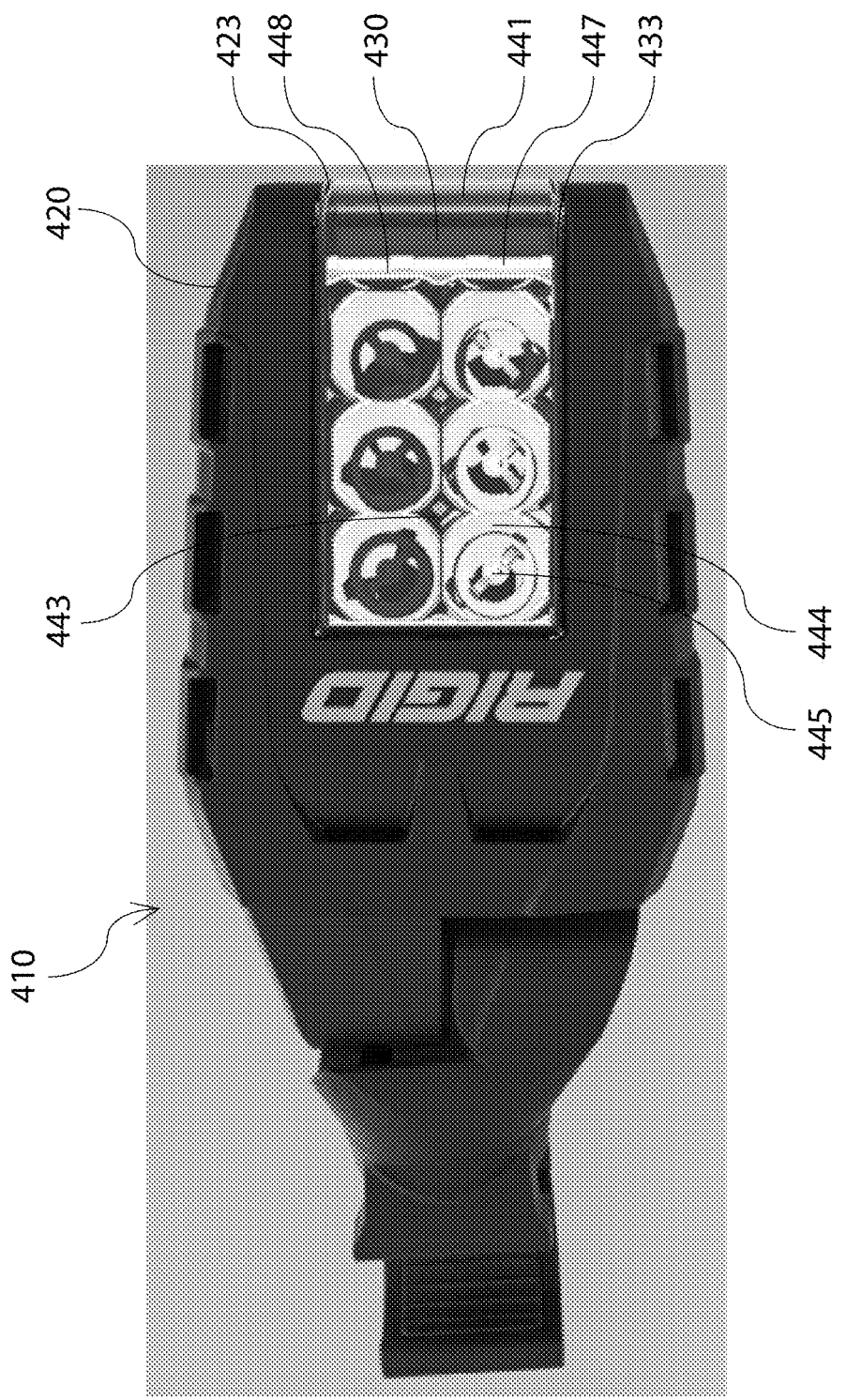
FIG. 4 illustrates a front view of a terrain viewing apparatus according to another embodiment of the present invention.

FIG. 4 illustrates a front view of a terrain viewing apparatus 410 according to another embodiment of the present invention. The terrain viewing apparatus 410 may include a housing 420, and may be capable of receiving a lighting apparatus 430 at a forward opening 423 of the housing 420 to emit light from housing 420.

One or more PCBAs, one or more LEDs, and one or more optics may be contained within a channel 433 of lighting apparatus 430. For example, a first optic 443 may include a first group of reflectors 444 (e.g., 6 reflectors), and a first group of lenses 445 (e.g., 6 lenses) for redirecting light from the LEDs (e.g., LEDs 1339 of FIG. 13). In this example, a single reflector 444 and a single lens 445 may be arranged in a set, and may redirect light from one or more LEDs positioned behind, adjacent to, or within close proximity to each lens (e.g., a flood beam pattern having about a 30 degree vertical span and about a 30 degree horizontal span of emission from each LED). In another example, a second optic 447 may include only a second group of reflectors 448 (e.g., no lenses present). In this example, each reflector 448 may be arranged to redirect light from one or more LEDs (e.g., a flood beam pattern having about a 40 degree vertical span and about a 60 degree horizontal span of emission from each LED). In another example, an optic may include a light pipe (not shown) positioned to redirect light from one or more LEDs emitting light into the light pipe (e.g., viewable in a range of about 180 degree in a vertical span and about 180 degrees in a horizontal span). In another example LEDs may emit light from housing 420 without substantial alteration by any lens or light pipe.

A media 441 may extend across, enclose, and/or seal channel 433 of lighting apparatus 430 (e.g., via adhesive). Furthermore, media 441 may extend across, enclose, and/or seal forward opening 423 of housing 420. Media 441 may be transparent, translucent, opaque, and/or may have regions of transparency, translucence, or opaqueness. Further, media 441 may be formed of a material selected to optimize performance characteristics (e.g., durability), such as polycarbonate. Each optic (e.g., first and second optics 443, 447) may be secured within the channel 433 by media 441. Alternatively, each optic may be secured within the channel 433 by one or more fasteners (not shown), securement brackets (not shown), or both.

Media 441 may be capable of acting as a light pipe, for the conveyance of light out of the housing. For example, at least a portion of light emitted by LEDs (e.g., LEDs 1339C of FIG. 13) may enter a side portion of media 441 before exiting the housing.

Figure 5:
FIG. 5 illustrates an isometric view of a terrain viewing apparatus according to another embodiment of the present invention.

FIG. 5 illustrates an isometric view of a terrain viewing apparatus 510 according to another embodiment of the present invention. The terrain viewing apparatus 510 may include a housing 520 with a lighting apparatus 530 secured therein for emitting light from housing 520. Lighting apparatus 530 may include one or more LEDs (e.g., LEDs 1339 of FIG. 13) arranged into one or more operational groups. Further, lighting apparatus 530 may include one or more optics (e.g., optics 543, 547), for distributing light emitted by each operational group of LEDs.

A PCBA (e.g., PCBA 1336 of FIG. 13) may include control circuitry to provide power and/or control of the operational groups of LEDs in accordance with one or more modes of operation, such that each operational group may be activated independently, interdependently, and/or collectively in one or more modes of operation. For example, a first operational group of LEDs may each emit a constant beam of light in one operational mode. In another example, the LEDs in two or more operational groups may each emit constant beams of light in one operational mode. In another example, an operational group of LEDs may emit intermittent beams of light in one operational mode (e.g., strobing). In another example, a first and a second operational group of LEDs may emit constant beams of light in a first operational mode (e.g., collectively), and a third operational group of LEDs may emit intermittent beams of light in a second operational mode (e.g., independently).

The one or more modes of operation may differ in the way operational groups of LEDs are activated to emit light, as described herein, and further may differ in power level, color, intermittency (e.g., strobing rates), and in any other suitable manner. For example, a first mode of operation may provide a first power level to one or more operational groups of LEDs, and a second mode of operation may provide a second power level different from the first power level. In another example, a first mode of operation may be enabled for a first operational group of LEDs having a first color, and a second mode of operation may be enabled for a second operational group of LEDs having a second color.

The LEDs and/or PCBA may generate heat when activated. Lighting apparatus 530 may be formed of a material selected to optimize performance characteristics (e.g., to enable dissipation of heat away from the LEDs and/or PCBAs). For example, lighting apparatus 530 may be formed of metal (e.g., aluminum), plastic (e.g., Lexan resin), composite material (e.g., glass-filled nylon), and/or any combination thereof. Further, lighting apparatus 530 may include one or more fins (e.g., fins 1335 of FIG. 13) to further aid in the dissipation of heat away from the LEDs and/or the PCBA. The fins may be formed integrally with and/or separately from the lighting apparatus 530.

Housing 520 may have one or more intakes 527 and/or scoops 529 for inducing turbulent air flow across lighting apparatus 530, the fins, or both. For example, housing 520 may have three intakes 527 and three scoops 529. In another example, housing 520 may have as many intakes 527 as there are scoops 529. In another example, housing 520 may have more or less intakes 527 than there are scoops 529.

Figure 6:
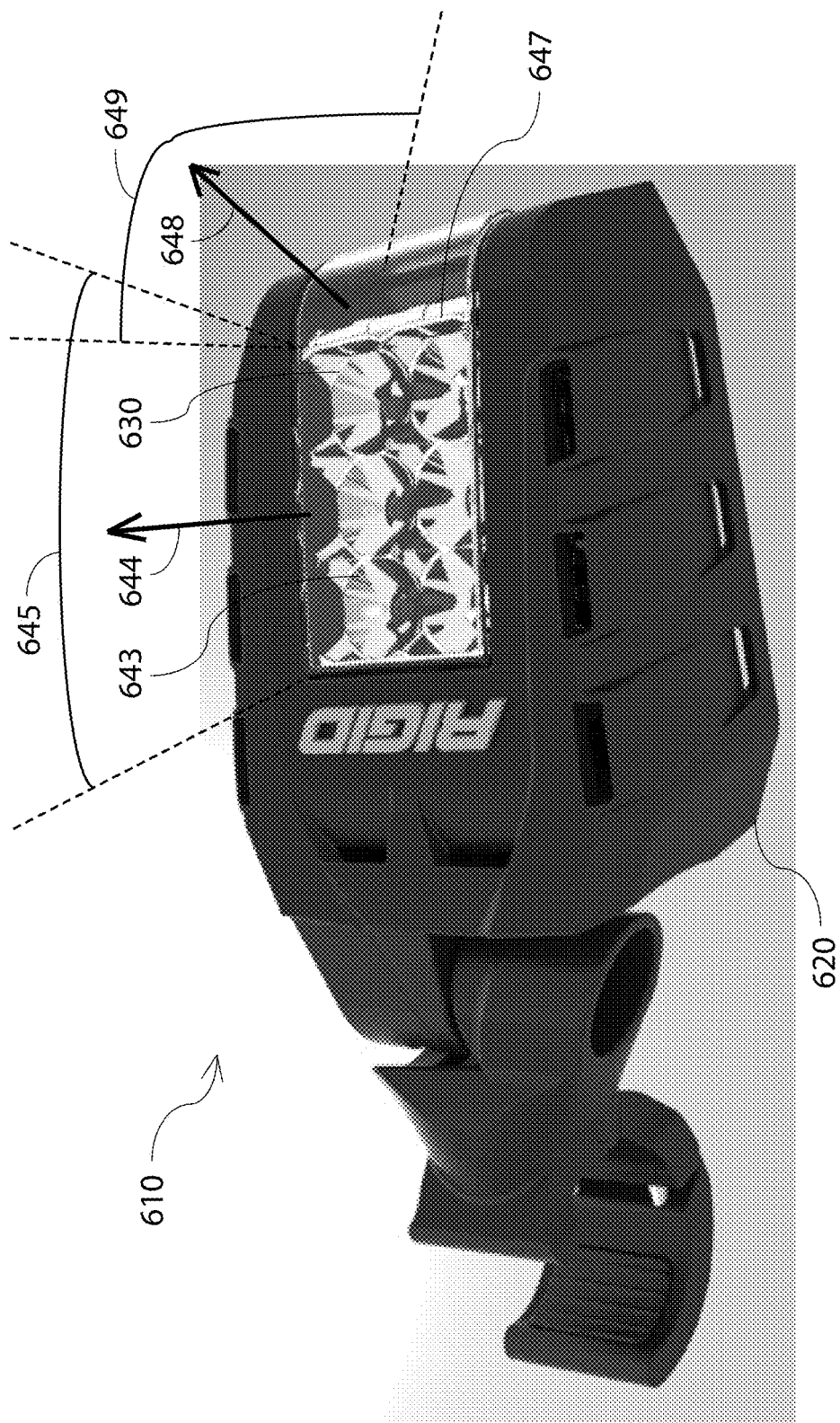
FIG. 6 illustrates an isometric view of a terrain viewing apparatus according to another embodiment of the present invention.

FIG. 6 illustrates an isometric view of a terrain viewing apparatus 610, according to another embodiment of the present invention. The terrain viewing apparatus 610 may include a housing 620 with a lighting apparatus 630 secured therein for emitting light from housing 620. Lighting apparatus 630 may include one or more LEDs (e.g., LEDs 1339 of FIG. 13) arranged into one or more operational groups. Further, lighting apparatus 630 may include one or more optics (e.g., 643, 647), for distributing light emitted by each operational group of LEDs.

At least a first optic (e.g., optic 643), corresponding to a first operational group of LEDs, may redirect light into a first direction (e.g., substantially forwardly of housing 620), as indicated by arrow 644, and/or in a span of emission, as indicated by span 645. At least a second optic (e.g., optic 647), corresponding to a second operational group of LEDs, may redirect light into a second direction (e.g., substantially laterally, or sideward of housing 620), as indicated by arrow 648, and/or in a span of emission, as indicated by span 649. Direction 648 may be substantially perpendicular or non-perpendicular to direction 644. A third operational group of LEDs may emit light with or without an optic (e.g., a light pipe), and in a direction parallel or non-parallel to direction 648 and/or direction 644, and/or in a span coextensive with, overlapping with, or separate from span 649 and/or span 645. Span of emission 645 may overlap span of emission 649.

Figure 7:
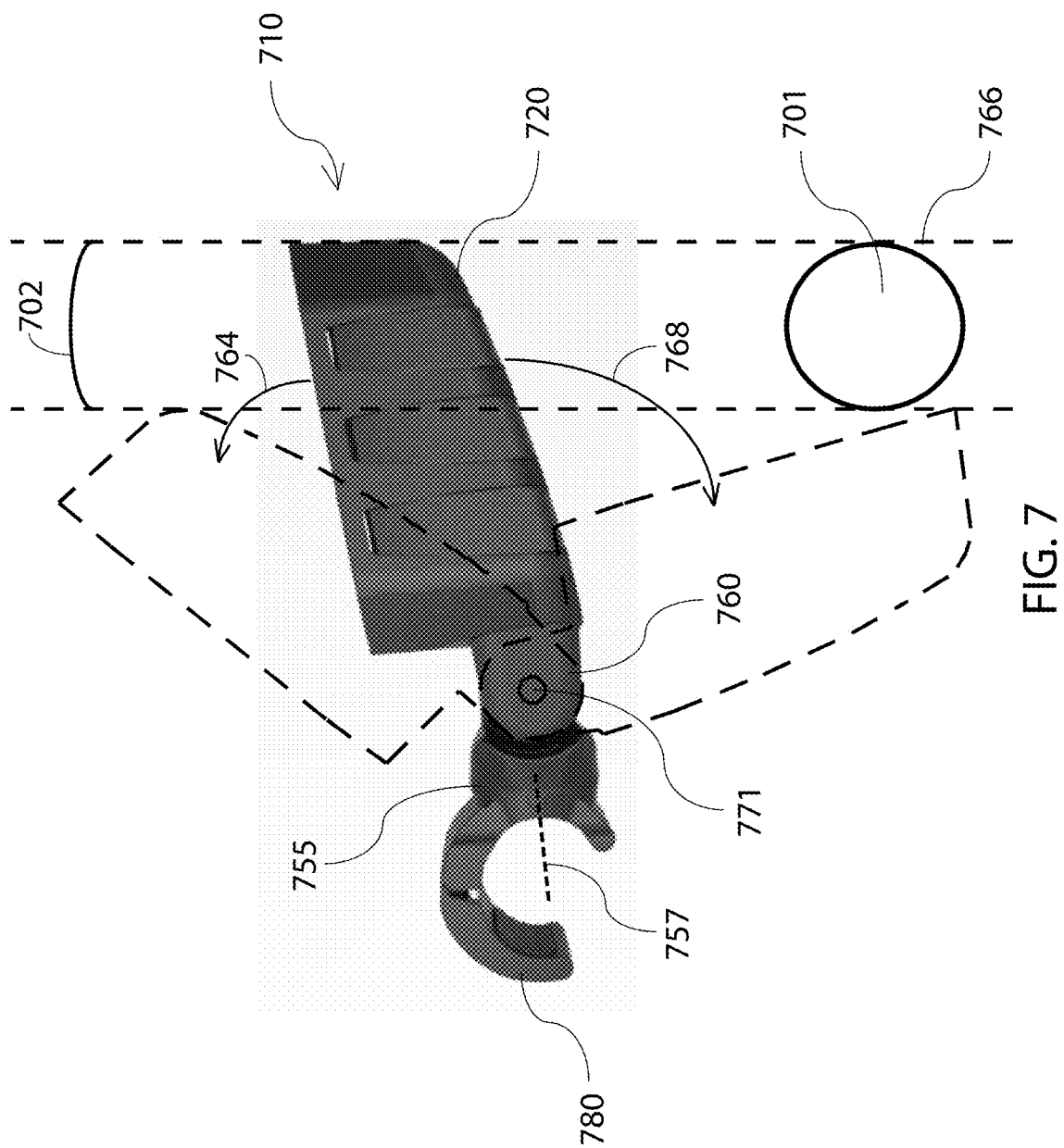
FIG. 7 illustrates a top view of a terrain viewing apparatus according to another embodiment of the present invention.

FIG. 7 illustrates a top view of a terrain viewing apparatus 710 according to another embodiment of the present invention. The terrain viewing apparatus 710 may be mounted to a vehicle (e.g., vehicle 105 of FIG. 1) by mounting apparatus 780. The terrain viewing apparatus 710 may include a housing 720 connected to one or more joints (e.g., joints 755, 760), which may provide housing 720 with one or more rotational and/or translational degrees of freedom. In general, roll may refer to rotation about an axis extending forwardly and/or rearwardly of the vehicle (e.g., rotation about an axis parallel to axis 766), yaw may refer to rotation about an axis extending upwardly and/or downwardly of the vehicle (e.g., rotation about an axis extending through pivot point 771), and pitch may refer to rotation about an axis extending rightwardly and/or leftwardly of the vehicle (e.g., rotation about axis 757).

A first joint 755 may enable a rotational degree of freedom about axis 757, which may correspond to a pitch rotation of housing 720 with respect to the vehicle. First joint 755 may be capable of about 360 degrees of freedom. A second joint 760 may enable one or more rotational degrees of freedom (e.g., roll, yaw, and pitch rotations of housing 720). Second joint 760 may be capable of a range of rotation in each degree of freedom. For example, joint 760 may enable housing 720 to rotate about a pivot point 771 in about 180 degrees of yaw rotation (e.g., pivot point 771 may correspond to axis 867 of FIG. 8.).

During operation of the vehicle, housing 720 may undergo yaw rotation due to adjustment by an operator of the vehicle, in response to terrain, or both. For example, the operator may manually adjust housing 720 to cause light to be emitted in a particular direction. In another example, movement of the vehicle may cause housing 720 to contact an environmental condition 701 (e.g., a tree branch) of the terrain. Joint 760 may enable housing 720 to rotate rearwardly, as indicated by arrow 764, to move out of a path of movement 702 of environmental condition 701 with respect to the vehicle. Similarly, joint 760 may enable housing 720 to rotate forwardly, as indicated by arrow 768. Thus, joint 760 may enable housing 720 to breakaway from its preset condition in response to a force being applied to any portion of housing 720. Thus, joint 760 may enable movement of housing 720, such that terrain viewing apparatus 710 is not broken by environmental condition 701.

Figure 8:
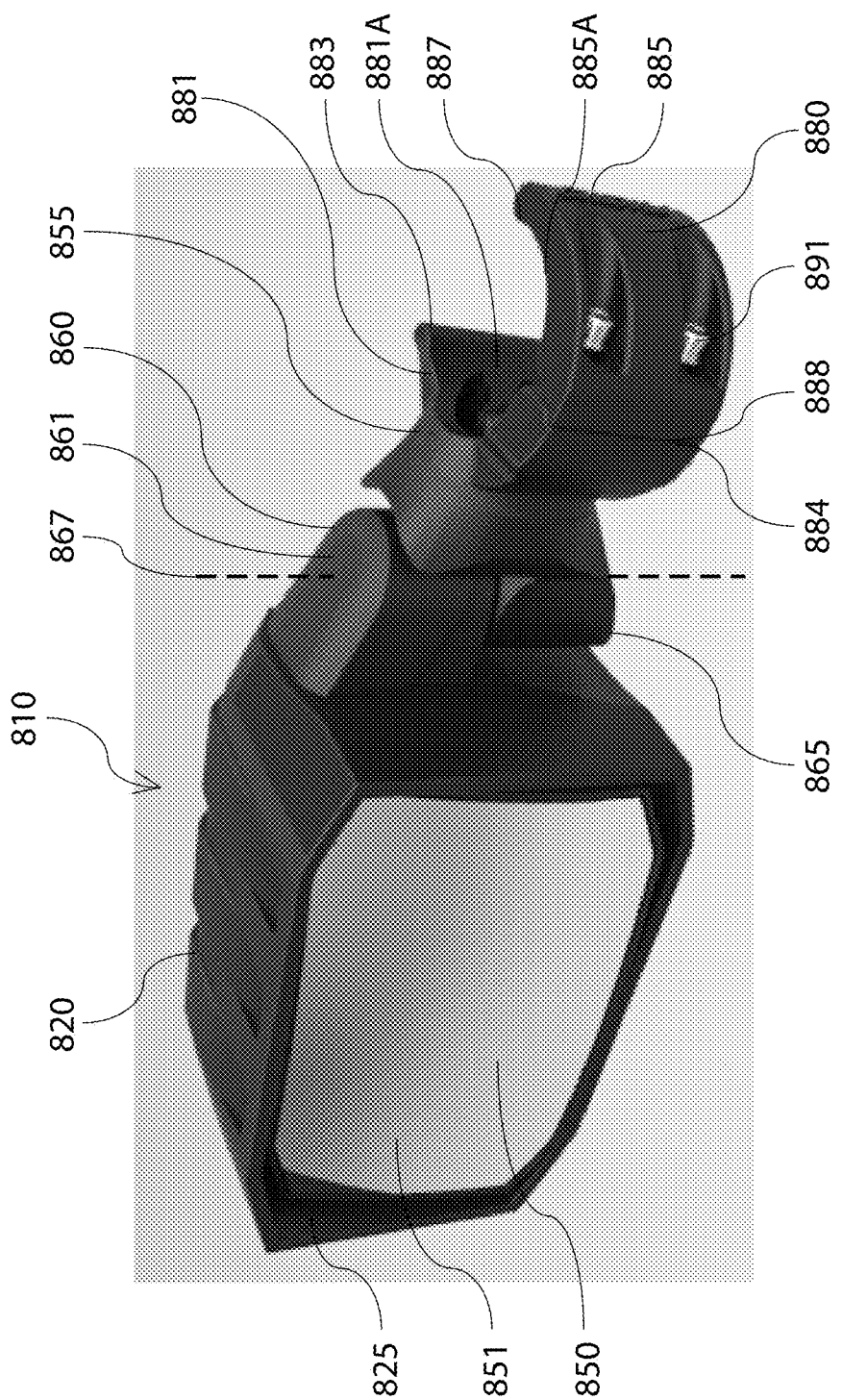
FIG. 8 illustrates an isometric view of a terrain viewing apparatus according to another embodiment of the present invention.

FIG. 8 illustrates an isometric view of a terrain viewing apparatus 810 according to another embodiment of the present invention. The terrain viewing apparatus 810 may include a housing 820 mounted to a vehicle (e.g., vehicle 105, of FIG. 1) by mounting apparatus 880. One or more joints (e.g., joints 855, 860) may enable securement of housing 820 to mounting apparatus 880 with one or more degrees of freedom.

Figure 15:
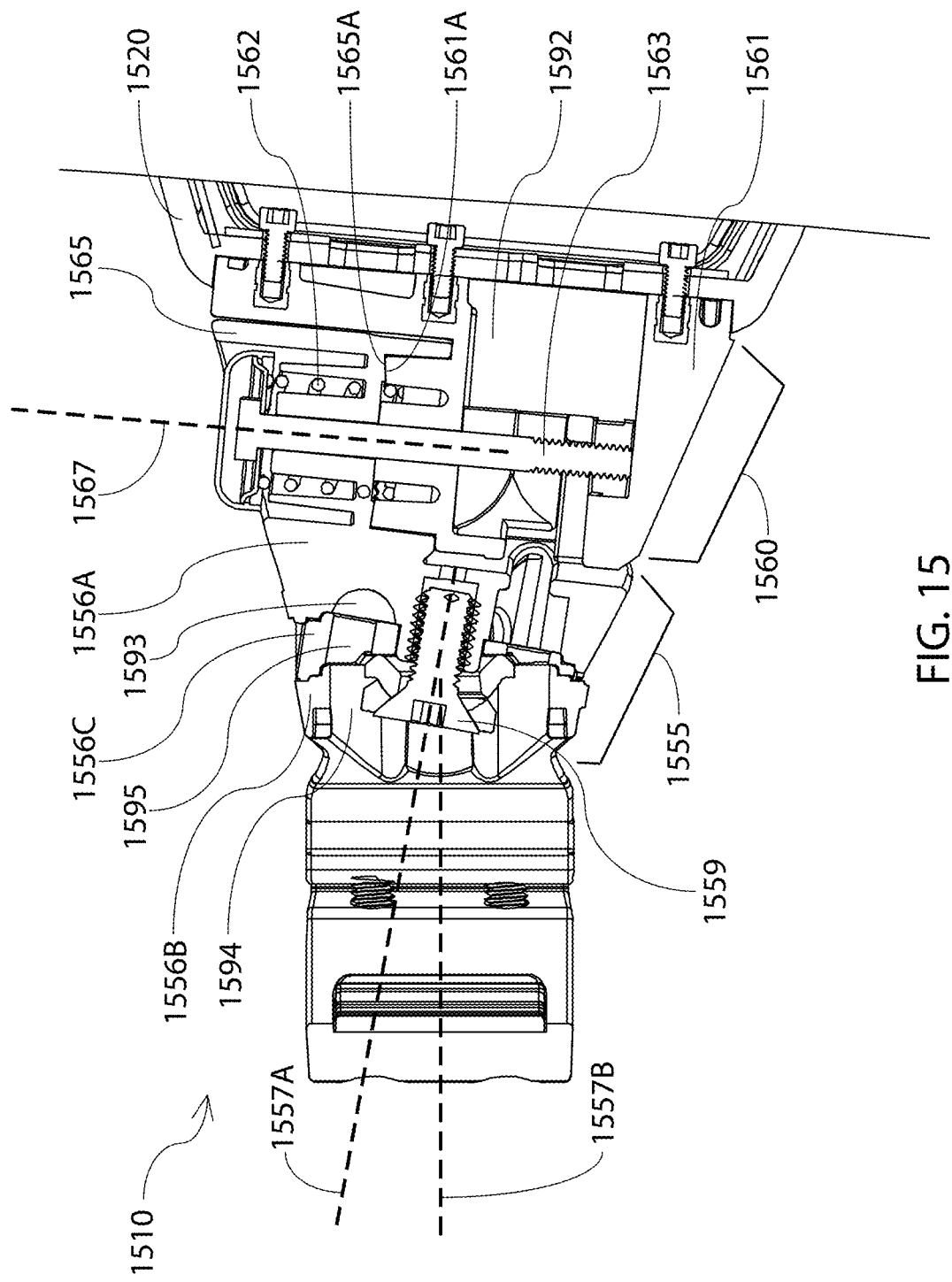
FIG. 15 illustrates a cross-sectional view of the joints of FIG. 1.

Joint 860 may have a first portion 861 with a first cam surface (e.g., first cam surface 1561A of FIG. 15) which contacts a second cam surface (e.g., second cam surface 1565A of FIG. 15) of a second portion 865. First portion 861 may be secured to housing 820, and second portion 865 may be secured to mounting apparatus 880 (e.g., via joint 855). First and second portions 861, 865 may be secured together by at least one fastener (e.g., fastener 1563 of FIG. 15), such that the first and second cam surfaces are frictionally engaged with each other. For example, the fastener may be secured at a first end to the first portion 861, may extend through an aperture of the first cam surface and an aperture of the second cam surface, and may be secured at a second end to the second portion 865 (e.g., as illustrated in FIG. 15). A spring (e.g., spring 1562 of FIG. 15) secured at either end of the fastener may enable regulation of the frictional engagement (e.g., to a predetermined frictional value). The frictional value may be great enough to hold housing 820 in place during static and/or dynamic operation of the vehicle, but small enough to enable operator adjustment and/or breakaway upon contact with an environmental condition (e.g., environmental condition 701 of FIG. 7).

The first and second cam surfaces may be flat, to enable rotation of housing 820 about a single rotational degree of freedom (e.g., a yaw rotation about axis 867), wherein joint 860 may be capable of about a 180 degree yaw rotation. Alternatively, the first and second cam surfaces may be spherical, to enable rotation of housing 820 about three rotational degrees of freedom (e.g., roll, yaw, and pitch), wherein joint 860 may be capable of about 20 degrees of roll rotation, 180 degrees of yaw rotation, and 20 degrees of pitch rotation. The spherical cam surfaces may enable the operator to achieve greater optimization in the orientation of housing 820 with respect to the vehicle, which may be particularly useful to compensate for a wide variation between mounting arrangements of structural elements (e.g., structural element 106 of FIG. 1) from one vehicle to another (e.g., variations between brands and vehicle models).

Reflecting apparatus 850 may be positioned in a rearward opening 824 of housing 820, to increase the rear-view line of sight of the operator of the vehicle. Reflecting apparatus 850 may include one or more mirrors 851 mounted within rearward opening 825. Mirrors 851 may be flat, curved, or both. For example, at least one mirror 851 may be convex, to increase the operator's field of view. In another example, a first mirror may be flat, and a second mirror may be curved. In another example, at least one mirror 851 may have regions of curvature and regions of flatness. Mirrors 851 may be formed of a material selected to optimize performance characteristics (e.g., durability, reflectivity). For example, mirrors 851 may be formed of polycarbonate. In another example, mirrors 851 may be formed of a reflective material. In another example, mirrors 851 may have a reflective coating.

Mirrors 851 may be mounted to housing 820 and/or to a lighting apparatus (e.g., lighting apparatus 130, of FIG. 1). For example, mirrors 851 may be mounted via fasteners (not shown), an adjustable mount (e.g., joint 1452 of FIG. 14), or both. Mirrors 851 may substantially cover rearward opening 825 of housing 820, but may not enclose and/or seal opening 825, such that air flow may pass through rearward opening 825 between reflecting apparatus 850 and housing 820. For example, an adjustable mount may enable one or more rotational degrees of freedom of mirrors 851 (e.g., a pitch rotation and/or a yaw rotation with respect to the vehicle).

The degrees of freedom provided by the adjustable mount may be operable independently of the degrees of freedom provided by joint 860 and/or joint 855. Accordingly, an operator may be capable of adjusting housing 820 to a desired orientation with respect to the vehicle to optimize the direction of emitted light, then adjusting mirrors 851 to achieve a desired rear-view line of sight, and may do so without sacrificing the orientation of housing 820 with respect to the vehicle (e.g., the direction of emitted light).

Mounting apparatus 880 may enable attachment of housing 820 to the vehicle (e.g., to structural element 106, of FIG. 1). For example, mounting apparatus 880 may have a mounting bracket 881 and a mounting arm 885. Mounting bracket 881 and mounting arm 885 may each extend around at least a portion of a structural element (e.g., a circumference of structural element 106 of FIG. 1, where structural element 106 is a bar), such that the structural element may be secured between mounting arm 885 and mounting bracket 881. For example, the structural element may be secured between an inner surface 881A of mounting bracket 881 and an inner surface 885A of mounting arm 885. In another example, the structural element may be secured between one or more securement ribs 883 on mounting bracket 881 (e.g., two ribs) and one or more securement ribs 887 on mounting arm 885 (e.g., one rib). Accordingly, securement between at least three ribs (e.g., ribs 883, 887) may enable stable securement of the structural element, and may further enable mounting apparatus 880 to accommodate bars of different sizes (e.g., between about 1.5 inches and about 2.5 inches). A high friction pad (e.g., pad 589, of FIG. 5) may be located along the inner surface 881A of mounting bracket 881 and/or along the inner surface 885A of mounting arm 885 to prevent translational and/or rotational movement of mounting apparatus 880 with respect to the structural element.

Mounting arm 885 may be secured to mounting bracket 881 to cause securement of the structural element therebetween. For example, mounting arm 885 may be attached to mounting bracket 881 by one or more fasteners 891. In another example, mounting arm 885 may pivot with respect to mounting bracket 881. In another example, mounting arm 885 may have a cam surface 888 that contacts a cam surface 884 of mounting bracket 881. Movement between cam surfaces 884, 888 may be accomplished by tightening fasteners 891. Cam surfaces 884, 888 may be substantially cylindrical, such that tightening of fasteners 891 may cause mounting arm 885 to rotate with respect to mounting bracket 881. Tightening of fasteners 891 may cause the structural element to be secured (e.g. pinched) between mounting arm 885 and mounting bracket 881. Fasteners 891 may be located between cam surfaces 884, 888 and the structural element. The distance between fasteners 891 and cam surfaces 884, 888 may be maximized to increase the mechanical advantage for securing the structural element.

In another embodiment, mounting apparatus 880 may include only a mounting bracket 881. Mounting bracket 881 may be secured to housing 820 by one or more fasteners, and may further be secured to a structural element (e.g., a bumper) of a vehicle by one or more fasteners. In another embodiment, mounting arm 885 may be in the form of a strap that may be secured at opposing ends to mounting bracket 881, and may extend around a structural element.

Figure 9:
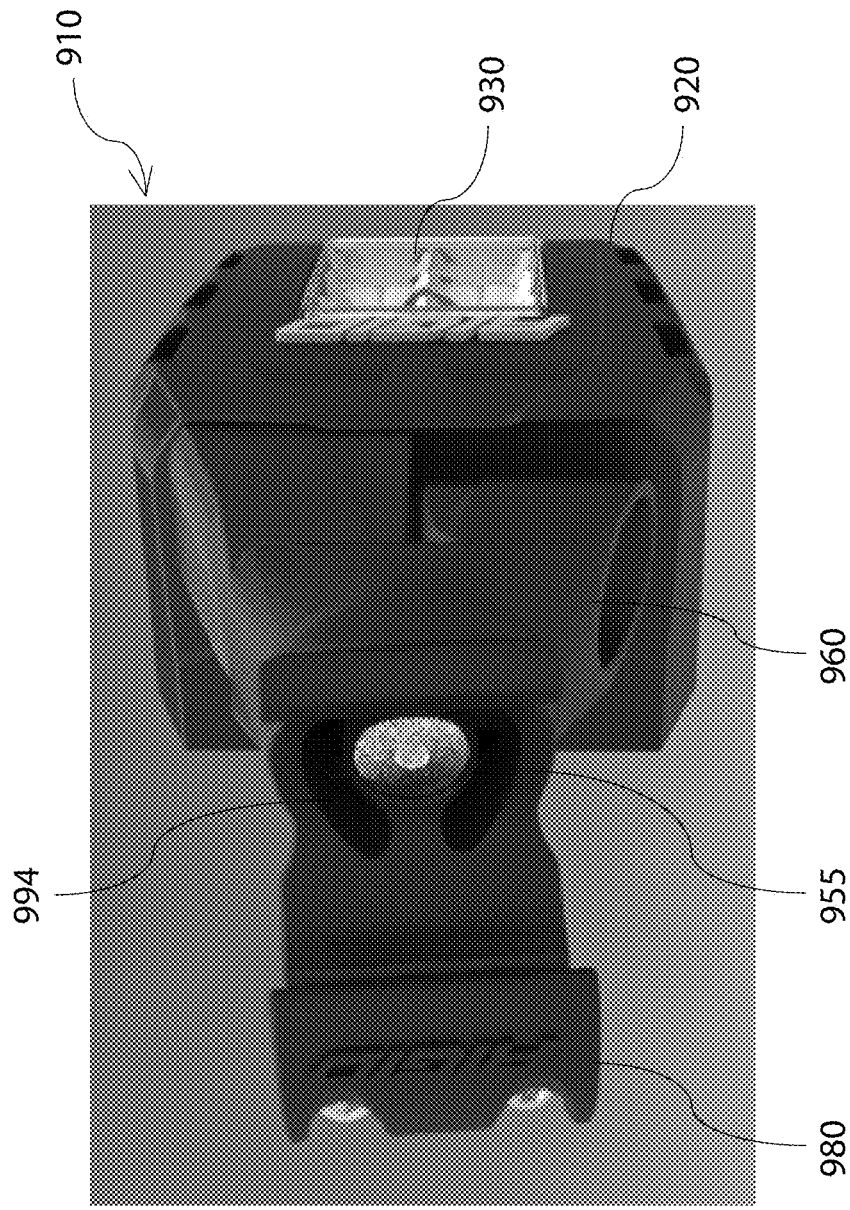
FIG. 9 illustrates a side view of a terrain viewing apparatus according to another embodiment of the present invention.

FIG. 9 illustrates a side view of a terrain viewing apparatus 910 according to another embodiment of the present invention. The terrain viewing apparatus 910 may include a housing 920, a lighting apparatus 930, a first joint 955, a second joint 960, and a mounting apparatus 980. Each of the components of the terrain viewing apparatus 910 may include one or more passageways (e.g., passageway 956) extending therethrough for passage of one or more electrical cables (e.g., cable 1340 of FIG. 13). The cables may provide power and/or operational control signals to the lighting apparatus 930 (e.g., to one or more PCBAs and/or one or more LEDs).

Figure 13:
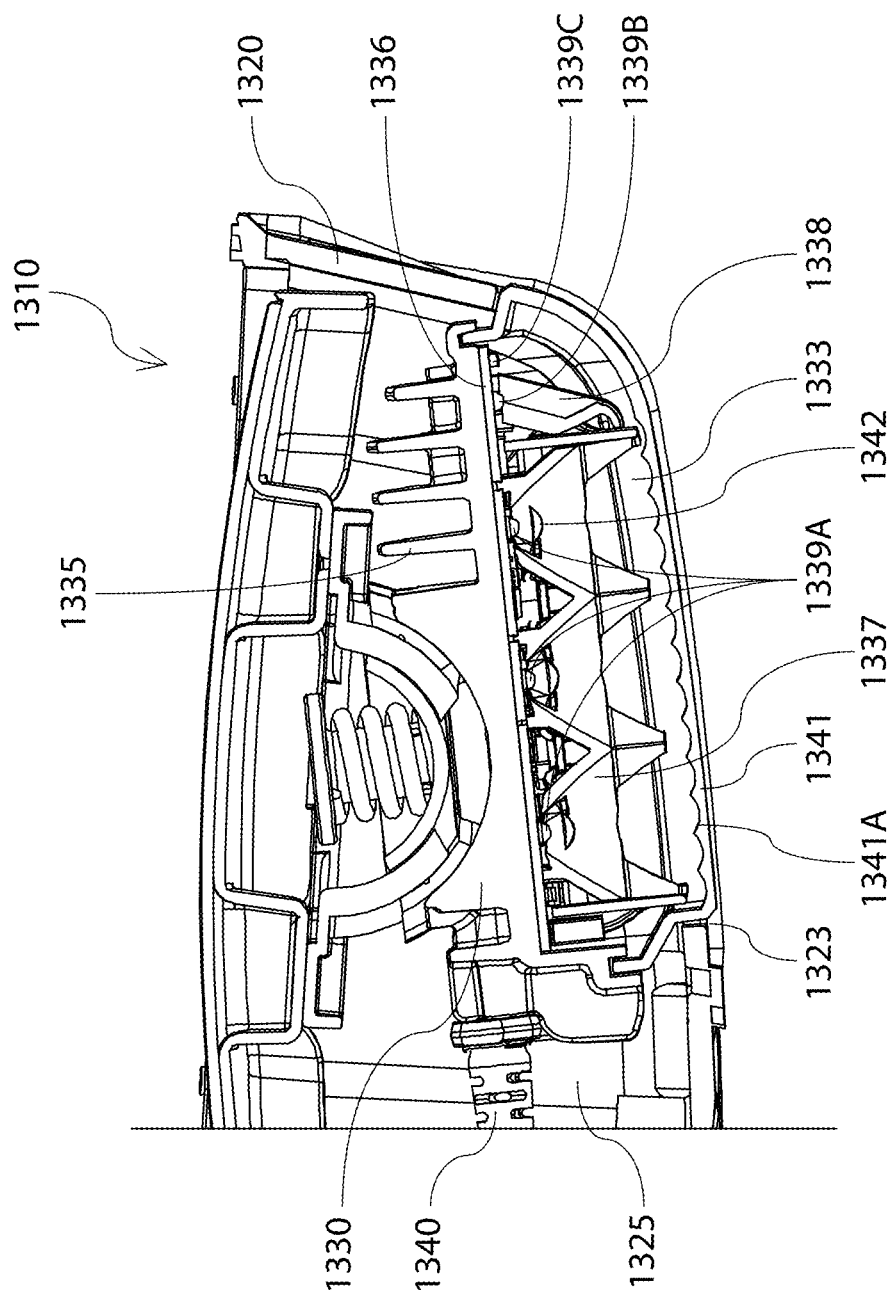
FIG. 13 illustrates a cross-sectional view of the housing of FIG. 1.

For example, cables (e.g., cable 1340 of FIG. 13) may extend through an aperture (not shown) in a wall of the lighting apparatus 930, and the aperture may be sealed (e.g., as illustrated in FIG. 13). In another example, the cables may extend through a hollow interior (e.g., hollow interior 1325 of FIG. 13) of housing 920. In another example, the cables may extend through one or more passageways (e.g., passageways 1592, 1593 of FIG. 15) extending through first and second portions of second joint 960 (e.g., first and second portions 861, 865 of FIG. 8). In another example, the cables may extend through a passageway (e.g., passageway 1594 of FIG. 15) extending through first joint 955 and/or through a passageway (e.g., passageway 1595 of FIG. 15) extending through a wedge-shaped element (e.g., third element 1556C of FIG. 15) of the first joint 955. In another example, the cables may extend through a first passageway (not shown) in mounting apparatus 980 to an exterior of the structural element (e.g., the cables may be run along the exterior of the structural element to a control system in the vehicle). In another example, the cables may extend through a second passageway 994 in mounting bracket 980 to an interior of the structural element (e.g., the cables may be run along the interior of the structural element to a control system in the vehicle). For example, an operator may run cables through the second passageway in order to hide the cables from view.

Figure 10:
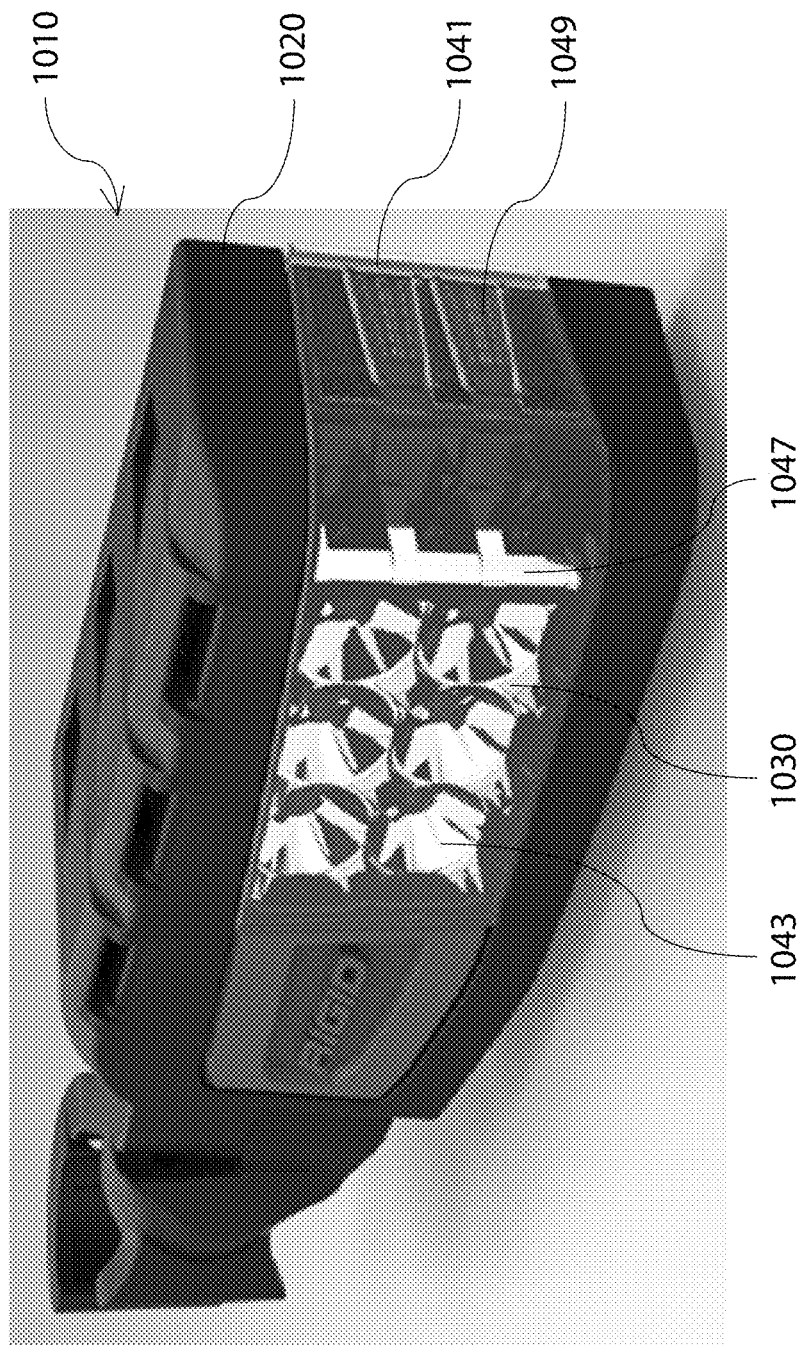
FIG. 10 illustrates an isometric view of a terrain viewing apparatus according to another embodiment of the present invention.

FIG. 10 illustrates an isometric view of a terrain viewing apparatus 1010 according to another embodiment of the present invention. The terrain viewing apparatus 1010 may include a housing 1020 with a lighting apparatus 1030 positioned therein. Lighting apparatus 1030 may have a first optic 1043, a second optic 1047, and a light pipe 1049 disposed therein for redistributing light emitted by one or more LEDs (e.g., LEDs 1339 of FIG. 13). Alternatively, a media 1041 extending over first optic 1043 and second optic 1047 may be capable of operating as a light pipe for redistributing light emitted by one or more LEDs. Optic 1043 may be oriented to redistribute light substantially forwardly of housing 1020, optic 1047 may be oriented to redistribute light substantially forwardly and laterally (e.g., rightward and/or leftward) of housing 1020, and light pipe 1049 and/or media 1041 may be configured to redistribute light forwardly, laterally, and rearwardly of housing 1020. For example, light pipe 1049 and/or media 1041 may extend from one or more LEDs to a forward end of housing 1020, from one or more LEDs to a side of housing 1020, and/or from one or more LEDs to a rearward end of housing 1020 as exemplified in FIGS. 10 and 11.

Figure 11:
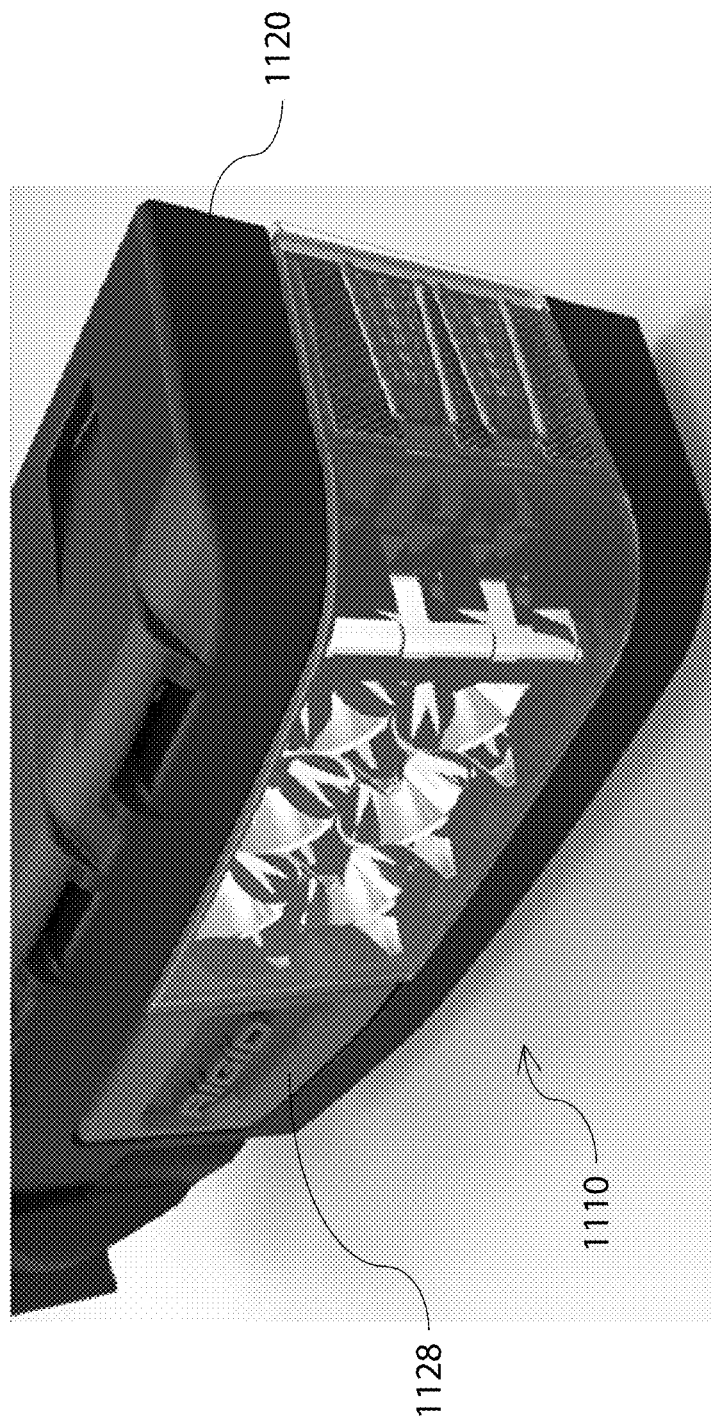
FIG. 11 illustrates an isometric view of a terrain viewing apparatus according to another embodiment of the present invention.

FIG. 11 illustrates an isometric view of a terrain viewing apparatus 1110 according to another embodiment of the present invention. The terrain viewing apparatus 1110 may include a housing 1120 and an insert 1128 to enable a color scheme of terrain viewing apparatus 1110 to be harmonized with a color scheme of a vehicle (e.g., vehicle 105 of FIG. 1). For example, housing 1120 may be black, and insert 1128 may be a first color (e.g., red), to match a vehicle having at least some coloring matching the first color. Various colors may be possible.

Figure 12:
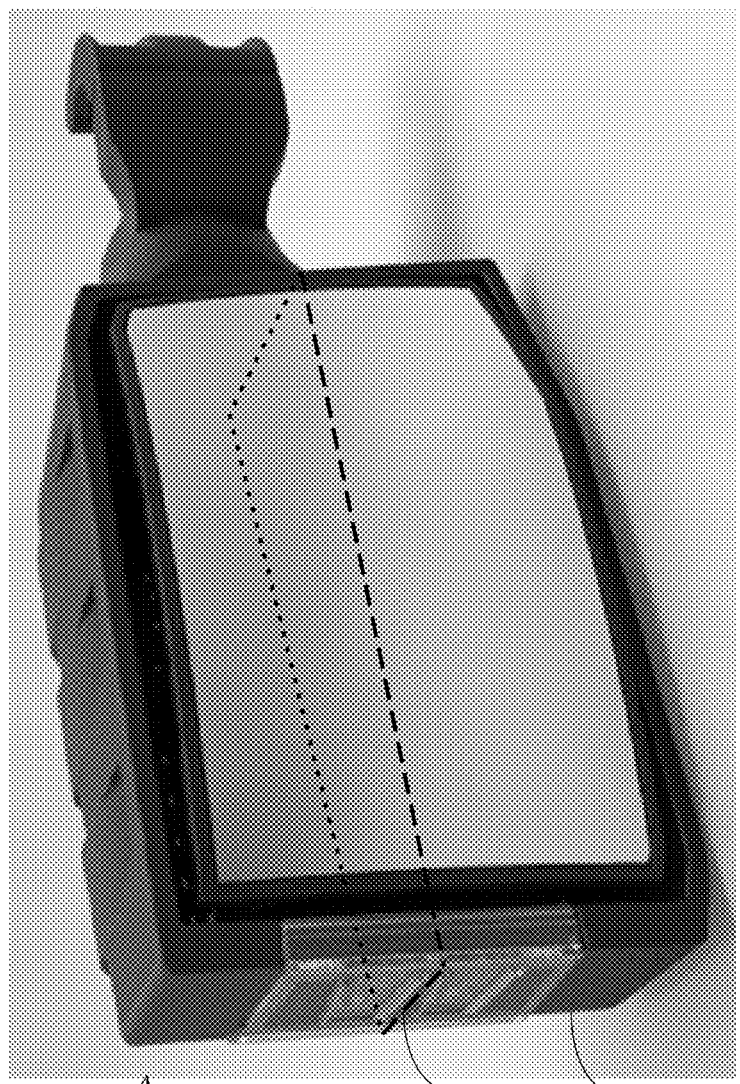
FIG. 12 illustrates an isometric view of a terrain viewing apparatus according to another embodiment of the present invention.

FIG. 12 illustrates an isometric view of a terrain viewing apparatus 1210 according to another embodiment of the present invention. The terrain viewing apparatus 1210 may include a housing 1220 that is nonsymmetrical across a horizontal cross-section (e.g., cross-section 1297). Alternatively, the terrain viewing apparatus 1210 may include a housing that is symmetrical across the horizontal cross-section (e.g., housing 420, of FIG. 4). A nonsymmetrical housing may require individual left and right side configurations for installment on a vehicle (e.g., vehicle 105 of FIG. 1), whereas a symmetrical housing may enable the terrain viewing apparatus 1210 to be reversed and used for either side of the vehicle.

FIG. 13 illustrates a cross-sectional view of a terrain viewing apparatus 1310 according to another embodiment of the present invention. The terrain viewing apparatus 1310 may include a lighting apparatus 1330 configured in a forward opening 1323 of a housing 1320. Lighting apparatus 1330 may be configured with a channel 1333 in substantial alignment with the forward opening 1323, such that one or more LEDs 1339 configured within the channel 1333 may be capable of emitting light through the forward opening 1323 to an exterior of the terrain viewing apparatus 1310.

The one or more LEDs 1339 may be configured on a PCBA 1336 within channel 1333. PCBA 1336 may receive power from a power source (e.g., cable 1340) extending into lighting apparatus 1330, such that PCBA 1336 may transfer, regulate and/or control power to one or more LEDs 1339 via control circuitry. LEDs 1339 may be configured into one or more operational groups (e.g., 1, 2, 3, 4, or more groups). For example, LEDs 1339A may be configured in a first operational group, LEDs 1339B may be configured in a second operational group, and LEDs 1339C may be configured in a third operational group. The control circuitry of PCBA 1336 may enable each operational group of LEDs to be operated individually, collectively, intermittently, and/or at one or more power levels, in one or more modes of operation.

One or more optics (e.g., first optic 1337) may be positioned over the one or more LEDs 1339 to redistribute and/or subtend light from the one or more LEDs 1339. For example, a first optic 1337 may be positioned over the first operational group of LEDs 1339A. In another example, a second optic 1338 may be positioned over the second operational group of LEDs 1339B. In another example, no optic may be positioned over the third operational group of LEDs 1339C. In another example, at least one optic may subtend light into a collimated beam (e.g., having light redirected into substantially parallel paths of travel). In another example, at least one optic may subtend light into a focused beam (e.g., having light redirected into a wider or narrower span of emission than that emitted from the LEDs).

One or more lenses (e.g., lenses 1342) may be positioned over the one or more LEDs 1339 to redistribute and/or subtend light from the one or more LEDs 1339. For example, lenses 1342 may be positioned over the first operational group of LEDs 1339A, the second operational group of LEDs 1339B, and/or the third operational group of LEDs 1339C. In another example, lenses 1342 may subtend light into a collimated beam and/or into a focused beam. Light emitted by the one or more LEDs 1339 may be subtended by at least one optic and/or at least one lens, such that no light emitted by the one or more LEDs 1339 may escape from lighting apparatus 1330 without first being subtended.

A media 1341 may be configured to extend over, enclose, and/or seal channel 1333 in order to protect PCBA 1336, control circuitry, and the one or more LEDs 1339 from moisture and other contaminants. Media 1341 may be secured to lighting apparatus 1330, housing 1320, or both. Further, media 1341 may be configured with features (e.g., lenticular curves 1341A) which enable subtending of light as it exits terrain viewing apparatus 1310. For example, lenticular curves 1341A may diffuse light across a horizontal plane when terrain viewing apparatus 1310 is mounted on a vehicle (e.g., vehicle 105 of FIG. 1). In another example, features may be included which diffuse light along other planes. In another example, features may be included which collimate and/or focus light. In another example, at least a portion of media 1341 may have no features for subtending light. Further, media 1341 may be transparent, translucent, opaque, and/or may have regions of transparency, translucency, or opaqueness. Further, media 1341 may be clear, colored, and/or may have regions of clear and colored material (e.g., such that light emitted by certain LEDs, or functional groups of LEDs exit the lighting apparatus 1330 having a color).

Lighting apparatus 1330 may be configured with one or more fins 1335 to aid in the dissipation of heat away from the one or more LEDs 1339, control circuitry, and/or PCBA 1336. For example, heat transferred to fins 1335 may be passed into the air flow induced by one or more intakes (e.g., intakes 527 of FIG. 5), and/or by one or more scoops (e.g., scoops 529 of FIG. 5).

Figure 14:
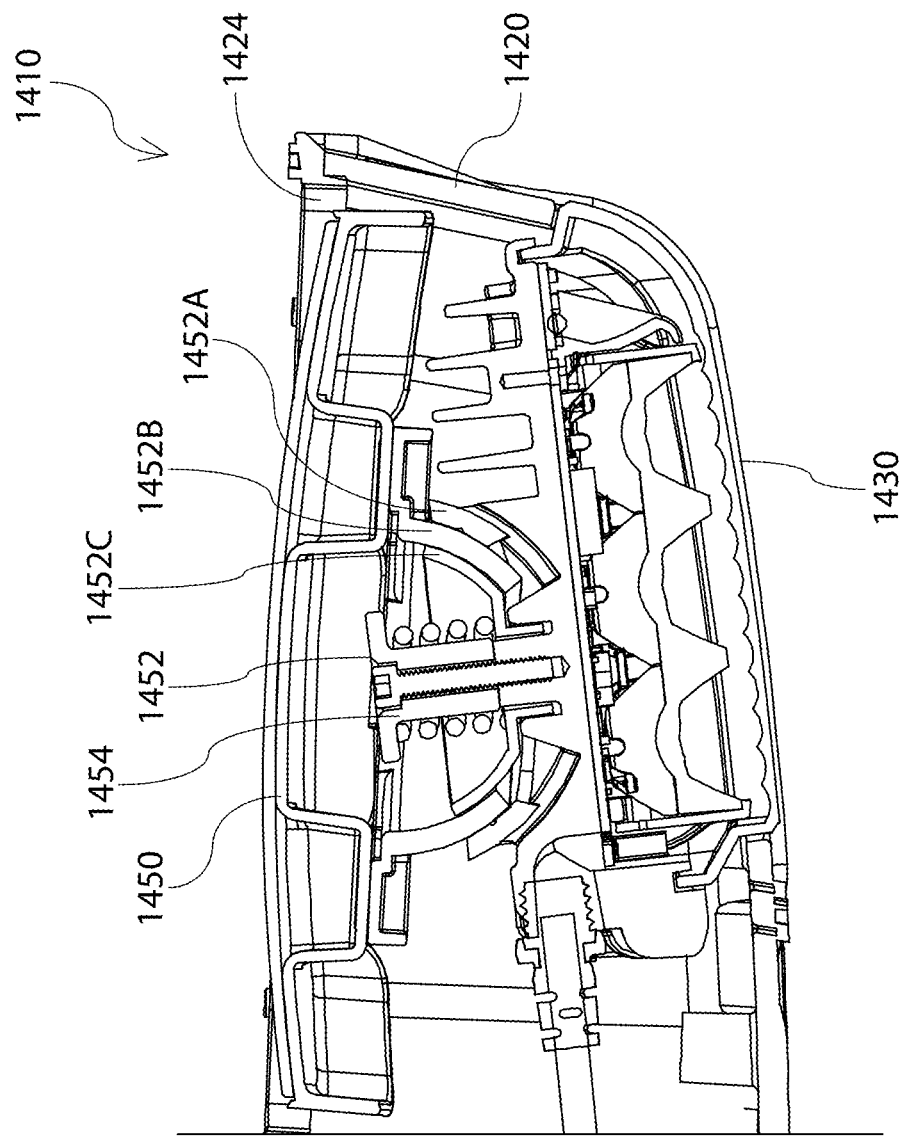
FIG. 14 illustrates a cross-sectional view of the housing of FIG. 1.

FIG. 14 illustrates a cross-sectional view of a terrain viewing apparatus 1410 according to another embodiment of the present invention. The terrain viewing apparatus 1410 may include a reflecting apparatus 1450 configured in a rearward opening 1424 of a housing 1420. Reflecting apparatus 1450 may be configured with a joint 1452, which may provide reflecting apparatus 1450 with one or more degrees of freedom. For example, joint 1452 may be connected to housing 1420 directly, or indirectly (e.g., via a lighting apparatus 1430). In another example, joint 1452 may have two or more curved elements (e.g., curved elements 1452A-c), which enable rotational movement about one or more axes of rotation (e.g., yaw).

A first curved element 1452A may be secured to housing 1420, directly or indirectly, and may be affixed by any suitable fastening means (e.g., via adhesive). A second curved element 1452B may be configured to interact with the first curved element 1452A, to enable rotational motion about one or more axes. A third curved element 1452C may be configured to interact with the second curved element 1452B, to cause the second curved element 1452B to be secured in place (e.g., creating a frictional engagement of the second curved element 1452B between the first and third curved elements 1452A, 1452C). Further the frictional engagement may be adjusted by means of an adjustable force applicator 1454 (e.g., comprising a spring and washer).

A person of ordinary skill in the art will appreciate that other fastening means may be employed to attach reflecting apparatus 1450 to housing 1420 (e.g., fasteners). Furthermore, a person of ordinary skill in the art will appreciate that joint 1452 may be composed of fewer (e.g., two curved surfaces to minimize the number of parts) or greater (e.g., four curved surfaces to increase degrees of freedom) numbers of curved surfaces. Further, a person of ordinary skill in the art will appreciate that other means of adjustment beyond those presented here may be used to enable rotational motion of the reflecting apparatus.

One or more mirrors 1451 may be secured to the second curved element 1452B, such that the one or more mirrors 1451 may be adjusted about the rotational degrees of freedom provided by the second curved element 1452B. Alternatively, a plurality of mirrors may be secured to housing 1420, such that each mirror, or groups of mirrors, may be adjustable by means of a dedicated joint 1452.

Alternatively, a person of ordinary skill in the art will appreciate that movement of reflecting apparatus 1450 may be driven by one or more electric motors, and such motors may be electrically coupled to a power source of the vehicle. Further, movement of reflecting apparatus 1450 may be controlled from the vehicle (e.g., from a dashboard switch of the vehicle).

FIG. 15 illustrates a cross-sectional view of a terrain viewing apparatus 1510 according to another embodiment of the present invention. The terrain viewing apparatus 1510 may include a housing 1520 which may be mounted to a vehicle (e.g., vehicle 105 of FIG. 1) via one or more joints (e.g., joints 1555, 1560). Joints 1555, 1560 may each provide housing 1520 with one or more rotational and/or translational degrees of freedom (e.g., roll, yaw, and/or pitch).

First joint 1555 may enable adjustment of housing 1520 by providing a rotational degree of freedom about one or more axes (e.g., axis 1557A and/or axis 1557B). For example, a first element 1556A may contact and be rotatable upon a second element 1556B about axis 1557B. In another example, first element 1556A may contact and be rotatable upon a third element 1556C about axis 1557A, and the third element 1556C may contact and be rotatable upon second element 1556B about axis 1557B (e.g., as exemplified in FIG. 15). In another example, third element 1556C may be substantially wedge shaped (e.g., narrower at a first end and wider at an opposing end). In another example, elements may contact one another and may be held in frictional engagement by a fastener (e.g., screw 1559).

In general, the terrain viewing apparatus 1510 may be mounted to a vehicle such that rotation of elements of first joint 1555 with respect to each other result substantially in a pitch rotation, yet a person of ordinary skill in the art will appreciate that other rotations may be possible. A person of ordinary skill in the art will also appreciate that inclusion of a wedge shaped third element 1556C between first and second elements 1556A, 1556B, may result in additional rotations (e.g., roll and/or yaw). Thus, third element 1556C may provide joint 1555 with more versatile adjustability and allow housing 1520 to be adequately installed on the vehicle for optimum use and positioning by an operator of the vehicle.

First element 1556A may be configured to rotate with respect to second element 1556B and/or third element 1556C by between about zero (0.0) degrees and about three hundred sixty (360) degrees about one or both of axes 1557A, 1557B. Third element 1556C may be configured to rotate with respect to second element 1556B and/or first element 1556A by between about zero (0.0) degrees and about three hundred sixty (360) degrees about one or both of axes 1557A, 1557B. Rotations in accordance with the above may also result in rotations of housing 1520 with respect to the vehicle of between about zero (0) and about thirty (30) degrees in one or both of a roll and/or a yaw rotation.

Second joint 1560 may enable adjustment of housing 1520 by providing a rotational degree of freedom about one or more axes (e.g., axis 1567). For example, a first portion 1561 may contact and be rotatable with respect to a second portion 1565 about axis 1567. In another example, a first cam surface 1561A of first portion 1561 may contact and be rotatable with respect to a second cam surface 1565A of second portion 1565. In another example, first portion 1561 may be held in frictional engagement against second portion 1565 by a securement means (e.g., via spring 1562 and fastener 1563). The force applied in the frictional engagement may be adjusted by tightening and/or loosening fastener 1563.

In general, first element 1556A of first joint 1555 may be integrally formed with second portion 1565 of second joint 1560, though a person of ordinary skill in the art will appreciate that other configurations may be possible. Alternatively, a person of ordinary skill in the art will appreciate that movement of housing 1520 may be driven by one or more electric motors, and such motors may be electrically coupled to a power source of the vehicle. Further, movement of the housing may be controlled from the vehicle (e.g., from a dashboard switch of the vehicle).

Figure 16:
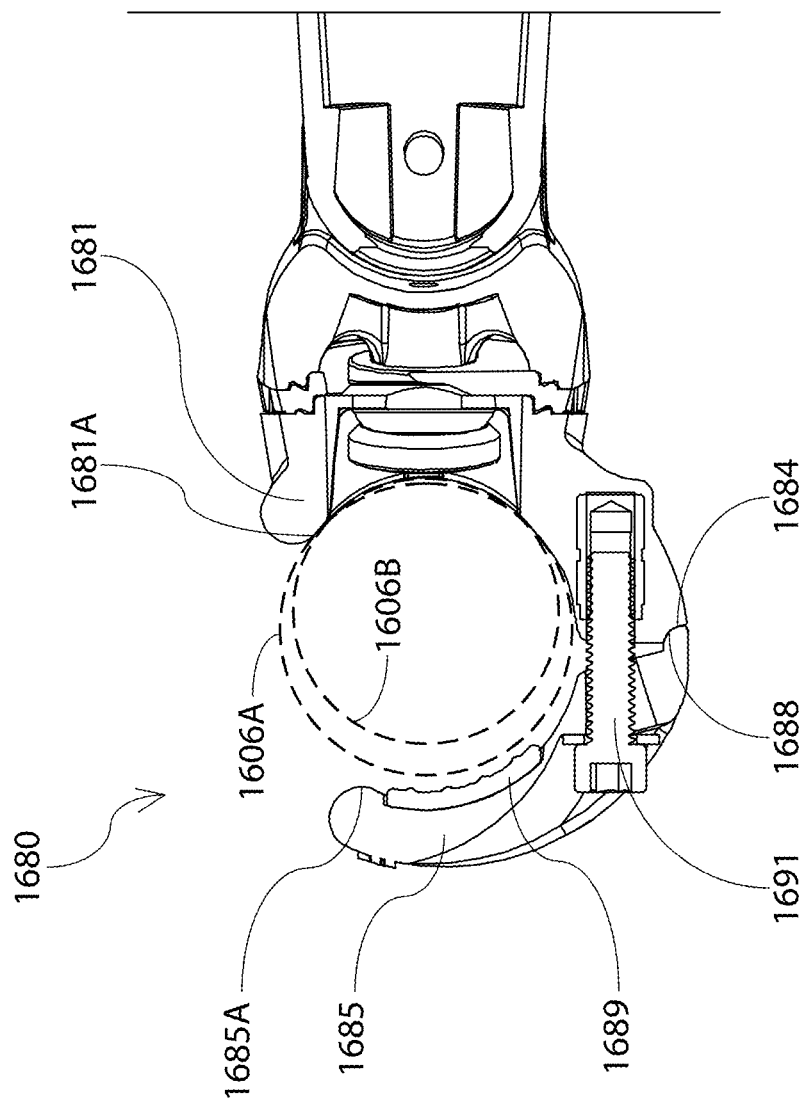
FIG. 16 illustrates a cross-sectional view of the mounting apparatus of FIG. 1.

FIG. 16 illustrates a cross-sectional view of a mounting apparatus 1680 for use with a terrain viewing apparatus (e.g., terrain viewing apparatus 110 of FIG. 1) according to another embodiment of the present invention. The mounting apparatus 1680 may include a mounting bracket 1681 and a mounting arm 1685 to enable mounting to a structural element (e.g., structural element 1606A). For example, mounting bracket 1681 and mounting arm 1685 may each extend around at least a portion of a structural element 1606A (e.g., where structural element 1606A is a bar), such that structural element 1606A may be secured between mounting arm 1685 and mounting bracket 1681. In another example, structural element 1606A may be secured between an inner surface 1681A of mounting bracket 1681 and an inner surface 1685A of mounting arm 1685. In another example, a high friction pad 1689 may be located along the inner surface 1681A of mounting bracket 1681 and/or along the inner surface 1685A of mounting arm 1685 to prevent translational and/or rotational movement of mounting apparatus 1680 with respect to structural element 1606A.

Mounting arm 1685 may be secured to mounting bracket 1681 to cause securement of structural element 1606A therebetween. For example, mounting arm 1685 may be attached to mounting bracket 1681 by one or more fasteners 1691. In another example, mounting arm 1685 may pivot with respect to mounting bracket 1681. In another example, mounting arm 1685 may have a cam surface 1688 that contacts a cam surface 1684 of mounting bracket 1681. Movement between cam surfaces 1684, 1688 may be accomplished by tightening fasteners 1691. Cam surfaces 1684, 1688 may be substantially cylindrical, such that tightening of fasteners 1691 may cause mounting arm 1685 to rotate with respect to mounting bracket 1681. Tightening of fasteners 1691 may cause structural element 1606A to be secured (e.g. pinched) between mounting arm 1685 and mounting bracket 1681. Fasteners 1691 may be located between cam surfaces 1684, 1688 and structural element 1606A, though a person of ordinary skill in the art will appreciate that other configurations are possible.

Alternatively, a different structural element 1606B may be secured between mounting bracket 1681 and mounting arm 1685 in accordance with the above principles. Structural element 1606B may be smaller that structural element 1606A. For example, structural element 1606A may represent a maximum sized bar for which mounting apparatus is capable of attachment, and structural element 1606B may represent a minimum sized bar for which mounting apparatus is capable of attachment. A person of ordinary skill in the art will appreciate that the precise dimensions of mounting apparatus 1680 may be configured to accommodate structural elements of any particular size and/or shape.

Figure 17:
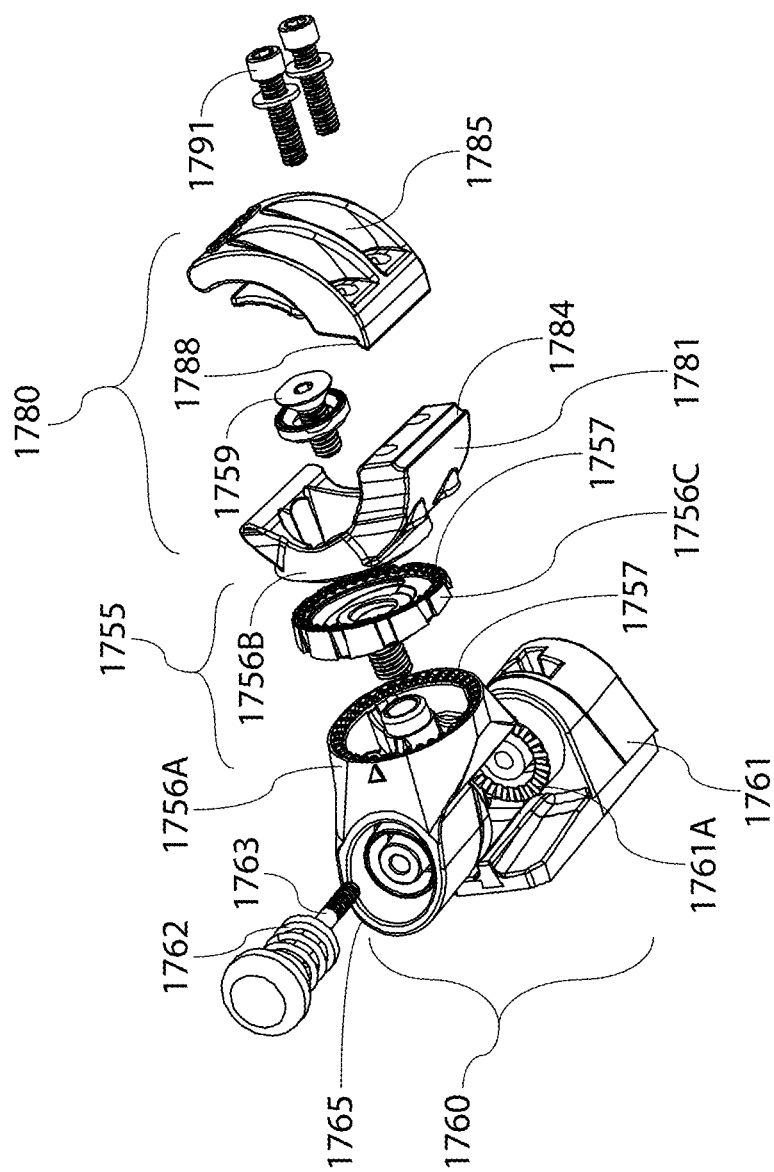
FIG. 17 illustrates an exploded view of one or more joints and a mounting apparatus.

FIG. 17 illustrates an exploded view of a first joint 1755, a second joint 1760, and a mounting apparatus 1780, according to an embodiment of the present invention. Though not shown, a housing may be connected to the second joint 1760, and may be adjustable with respect to a structural element (e.g., structural element 1606A) of a vehicle. Joints 1755, 1760 may each provide the housing with one or more rotational and/or translational degrees of freedom (e.g., roll, yaw, and/or pitch rotations).

First joint 1755 may include a first element 1756A, a second element 1756B, and a third element 1756C, which may contact and be rotatable upon each other (e.g., as described with reference to FIG. 15). Each of elements 1756A, 1756B, and 1756C may have one or more cam surfaces 1757 which contact adjacent elements. For example, first element 1756A may have a cam surface 1757 which contacts a cam surface 1757 of third element 1756C. In another example, second element 1756B may have a cam surface 1757 which contacts a cam surface 1757 of third element 1756C. In another example, third element 1756C may have two opposing cam surfaces. Cam surfaces 1757 may be substantially flat, may have periodic detents and/or catches around its perimeter, or may have periodic ridges and/or troughs around its perimeter. For example, tightening of a fastener (e.g., screw 1759) may cause cam surfaces 1757 to be frictionally engaged with each other, detents to be secured in catches, and/or ridges to be secured in troughs.

Thus, the housing may be secured in any orientation based on the rotational configuration of elements 1756A, 1756B, and 1756C. For example, the housing may be rotatable between about zero (0) degrees and about three hundred sixty (360) degrees in a pitch rotation. In another example, the housing may be rotatable between about zero (0) degrees and about thirty (30) degrees in a yaw rotation. In another example, the housing may be rotatable between about zero (0) degrees and about thirty (30) degrees in a roll rotation.

Second joint 1760 may include a first portion 1761 and a second portion 1765, which may contact and be rotatable upon each other (e.g., as described with reference to FIG. 15). Each of first and second portions 1761, 1765 may have one or more cam surfaces (e.g., cam surfaces 1761A, 1765A) which contact adjacent portions. For example, first portion 1761 may have a cam surface 1761A which contacts a cam surface (e.g., second cam surface 1565A of FIG. 15) of second portion 1765. Cam surfaces 1761A, 1765A may be substantially flat, may have periodic detents and/or catches around its perimeter, or may have periodic ridges and/or troughs around its perimeter. For example, tightening of a fastener (e.g., screw 1763) may cause cam surfaces 1761A, 1765A to be frictionally engaged with each other, detents to be secured in catches, and/or ridges to be secured in troughs.

Thus, the housing may be secured in any orientation based on the rotational configuration of first and second portions 1761, 1765. For example, the housing may be rotatable between about zero (0) degrees and about one hundred eighty (180) degrees in a yaw rotation. In general, first element 1756A of first joint 1755 may be integrally formed with second portion 1765 of second joint 1760, though a person of ordinary skill in the art will appreciate that other configurations may be possible.

Mounting apparatus 1780 may include a mounting arm 1785 secured to a mounting bracket 1781 to cause securement of a structural element therebetween (e.g., as described with reference to FIG. 16). For example, mounting arm 1785 may be attached to mounting bracket 1781 by one or more fasteners 1791. In another example, mounting arm 1785 may pivot and/or translate with respect to mounting bracket 1781. In another example, mounting arm 1785 may have a cam surface 1788 that contacts a cam surface 1784 of mounting bracket 1781. Movement between cam surfaces 1784, 1788 may be accomplished by tightening fasteners 1791. Cam surfaces 1784, 1788 may be substantially cylindrical, such that tightening of fasteners 1791 may cause mounting arm 1785 to rotate with respect to mounting bracket 1781. In general, second element 1756B of first joint 1755 may be integrally formed with mounting bracket 1781 of mounting apparatus 1780, though a person of ordinary skill in the art will appreciate that other configurations may be possible.

Other aspects and embodiments of the present invention will be apparent to those skilled in the art from consideration of the specification and practice of the invention disclosed herein. It is intended, therefore, that the specification and illustrated embodiments be considered as examples only, with a true scope and spirit of the invention being indicated by the following claims.

What is claimed is:

1. A terrain viewing apparatus, comprising:
   a housing;
   a lighting apparatus on a first side of the housing;
   a reflecting apparatus on a second side of the housing and connected to the housing by a first joint;
   a mounting apparatus coupled to the housing, the mounting apparatus configured to mount around a bar of a vehicle; and
   a second joint coupled between the housing and the mounting apparatus and configured to enable movement of the housing and lighting apparatus with respect to the mounting apparatus;
   wherein the first joint is configured to enable movement of the reflecting apparatus independently of the housing and lighting apparatus.

2. The terrain viewing apparatus of claim 1, wherein the second joint enables yaw and roll rotation of the housing and lighting apparatus with respect to the mounting apparatus.

3. The terrain viewing apparatus of claim 2, wherein the lighting apparatus emits light from one or more LEDs which receive regulated power from one or more printed circuit board assemblies.

4. The terrain viewing apparatus of claim 3, wherein the one or more LEDs are operable in one or more operational groups, and each operational group may be operated independently, collectively, or intermittently.

5. The terrain viewing apparatus of claim 3, wherein a first operational group of LEDs may emit light into a first direction substantially forwardly of the vehicle.

6. The terrain viewing apparatus of claim 3, wherein a second operational group of LEDs may emit light into a second direction substantially non-forwardly of the vehicle.

7. The terrain viewing apparatus of claim 1, wherein the reflecting apparatus includes one or more mirrors.

8. The terrain viewing apparatus of claim 7, wherein at least one of the one or more mirrors is convex.

9. The terrain viewing apparatus of claim 1, wherein the second joint is configured to enable pitch rotation of the housing and lighting apparatus with respect to the mounting apparatus.

10. The terrain viewing apparatus of claim 1, wherein the second joint includes a first element rotatable with respect to a second element about a first axis.

11. The terrain viewing apparatus of claim 10, wherein the second joint includes a first element, a second element, and a third element, wherein the first element is rotatable with respect to the third element about a first axis, and wherein the second element is rotatable with respect to the third element about a second axis non-linear with the first axis.

12. The terrain viewing apparatus of claim 1, further comprising a third joint coupled between the housing and the mounting apparatus and configured to enable movement of the housing and lighting apparatus with respect to the mounting apparatus.

13. The terrain viewing apparatus of claim 2, wherein the third joint is configured to enable yaw rotation of the housing and lighting apparatus with respect to the mounting apparatus.

14. The terrain viewing apparatus of claim 1, wherein the first joint is an interior joint which is configured to enable the reflecting apparatus to be rotated in a pitch and a yaw rotation with respect to the housing and lighting apparatus.

15. The terrain viewing apparatus of claim 1, wherein the first joint comprises a first curved element and a second curved element, wherein the first curved element and the second curved element are configured to enable yaw rotation of the reflecting apparatus with respect to the housing and lighting apparatus.

16. The terrain viewing apparatus of claim 15, wherein the first joint further comprises a third curved element configured to interact with the second curved element and secure the second curved element in place.

17. A terrain viewing apparatus coupled to a vehicle, comprising:
a housing;
a lighting apparatus coupled on a first side of the housing;
a first operational group of LEDs configured on the lighting apparatus to emit light into a first direction substantially forwardly of the vehicle;
a second operational group of LEDs configured on the lighting apparatus to emit light into a second direction substantially non-forwardly of the vehicle; and
a reflecting apparatus coupled on a second side of the housing and connected to the housing by a first joint
a mounting apparatus coupled to the housing;
a second joint between the housing and the mounting apparatus and configured to enable movement of the housing and lighting apparatus with respect to the mounting apparatus;
wherein the second joint include a first element, a second element, and a third element, wherein the first element is rotatable with respect to the third element about a first axis, and wherein the second element is rotatable with respect to the third element about a second axis non-linear with the first axis to enable yaw and roll rotation of the housing with respect to the mounting apparatus.

18. The terrain viewing apparatus of claim 15, wherein the third element is substantially wedge shaped.

19. The terrain viewing apparatus of claim 15, further comprising a fastener configured to hold the first element, second element, and third element in frictional engagement.

20. The terrain viewing apparatus of claim 19, wherein the lighting apparatus comprises at least two fins configured to dissipate heat away from the lighting apparatus.

21. The terrain viewing apparatus of claim of claim 18, further comprising a spring and a fastener, wherein the spring and fastener are configured to secure the first cam surface in frictional engagement against the second cam surface.

22. The terrain viewing apparatus of claim 18, further comprising a third joint coupled between the housing and the mounting apparatus and configured to enable movement of the housing and lighting apparatus with respect to the mounting apparatus.

23. A terrain viewing apparatus, comprising
a housing;
a lighting apparatus on a first side of the housing;
a reflecting apparatus on a second side of the housing and connected to the housing by a first joint;
a mounting apparatus coupled to the housing, the mounting apparatus configured to mount on a vehicle; and
a second joint coupled between the housing and the mounting apparatus and configured to enable movement of the housing and lighting apparatus with respect to the mounting apparatus;
wherein the first joint is configured to enable movement of the reflecting apparatus independently of the housing and lighting apparatus; and
wherein the second joint has a first cam surface affixed to the housing which contacts a second cam affixed to the mounting apparatus and the first and second cam surfaces are spherical and enable rotation of the housing and lighting apparatus in three rotational degrees of freedom relative to the mounting apparatus.

\* \* \* \* \*